United States Patent
Kawano

(10) Patent No.: US 8,928,941 B2
(45) Date of Patent: Jan. 6, 2015

(54) IMAGE PROCESSING APPARATUS, IMAGE FORMING APPARATUS, AND METHOD FOR PROCESSING IMAGES

(71) Applicant: Oki Data Corporation, Tokyo (JP)

(72) Inventor: Akimitsu Kawano, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/135,684

(22) Filed: Dec. 20, 2013

(65) Prior Publication Data
US 2014/0185067 A1  Jul. 3, 2014

(30) Foreign Application Priority Data
Dec. 27, 2012  (JP) .................. 2012-284443

(51) Int. Cl.
| | |
|---|---|
| H04N 1/50 | (2006.01) |
| G06K 15/00 | (2006.01) |
| H04N 1/407 | (2006.01) |
| G03F 3/08 | (2006.01) |
| H04N 1/46 | (2006.01) |
| G06K 9/00 | (2006.01) |
| H04N 1/54 | (2006.01) |
| H04N 1/58 | (2006.01) |

(52) U.S. Cl.
CPC . *H04N 1/50* (2013.01); *H04N 1/54* (2013.01); *H04N 1/58* (2013.01)
USPC ............ 358/1.9; 358/2.1; 358/3.26; 358/518; 358/538; 382/162; 382/167

(58) Field of Classification Search
CPC ...... B41J 2/2139; B41J 2/2132; H04N 1/506; H04N 1/60; G03G 15/5008; C08L 2666/04; C08L 33/00; G06T 11/001; B41F 31/22; D21H 27/002
USPC ............... 358/1.9, 2.1, 3.21, 3.23, 3.24, 3.26, 358/1.16, 534, 521, 524, 1.15, 1.13, 1.14, 358/538, 518; 399/82; 382/162, 167
See application file for complete search history.

(56) References Cited

U.S. PATENT DOCUMENTS

| | | | |
|---|---|---|---|
| 7,684,079 B2 * | 3/2010 | Takata et al. .................... | 358/1.9 |
| 7,787,138 B2 * | 8/2010 | Lofthus et al. ............... | 358/1.15 |
| 2010/0165398 A1 | 7/2010 | Watanabe | |
| 2014/0112581 A1 * | 4/2014 | James ........................... | 382/167 |

FOREIGN PATENT DOCUMENTS

| | | |
|---|---|---|
| JP | 2009-212990 A | 9/2009 |
| JP | 2010-152209 A | 7/2010 |

* cited by examiner

*Primary Examiner* — Charlotte M Baker
(74) *Attorney, Agent, or Firm* — Rabin & Berdo, P.C.

(57) ABSTRACT

An image processing apparatus prints an image without streaks on a medium. A receiving section receives base color image data and non-base color image data. A detecting section detects a boundary between a first area in which the base color image is printed and a second area which surrounds the first area and no image is printed therein. A correction section performs correction on the image data to generate one of a third area defined in a peripheral portion of the first area and a fourth area which is defined in a peripheral portion of the second area and is contiguous to the first area. A smaller amount of base color toner is consumed in the third and fourth area than in the first area. A printing section prints an image on a medium in accordance with the corrected base color image data and the non-base color image data.

20 Claims, 18 Drawing Sheets

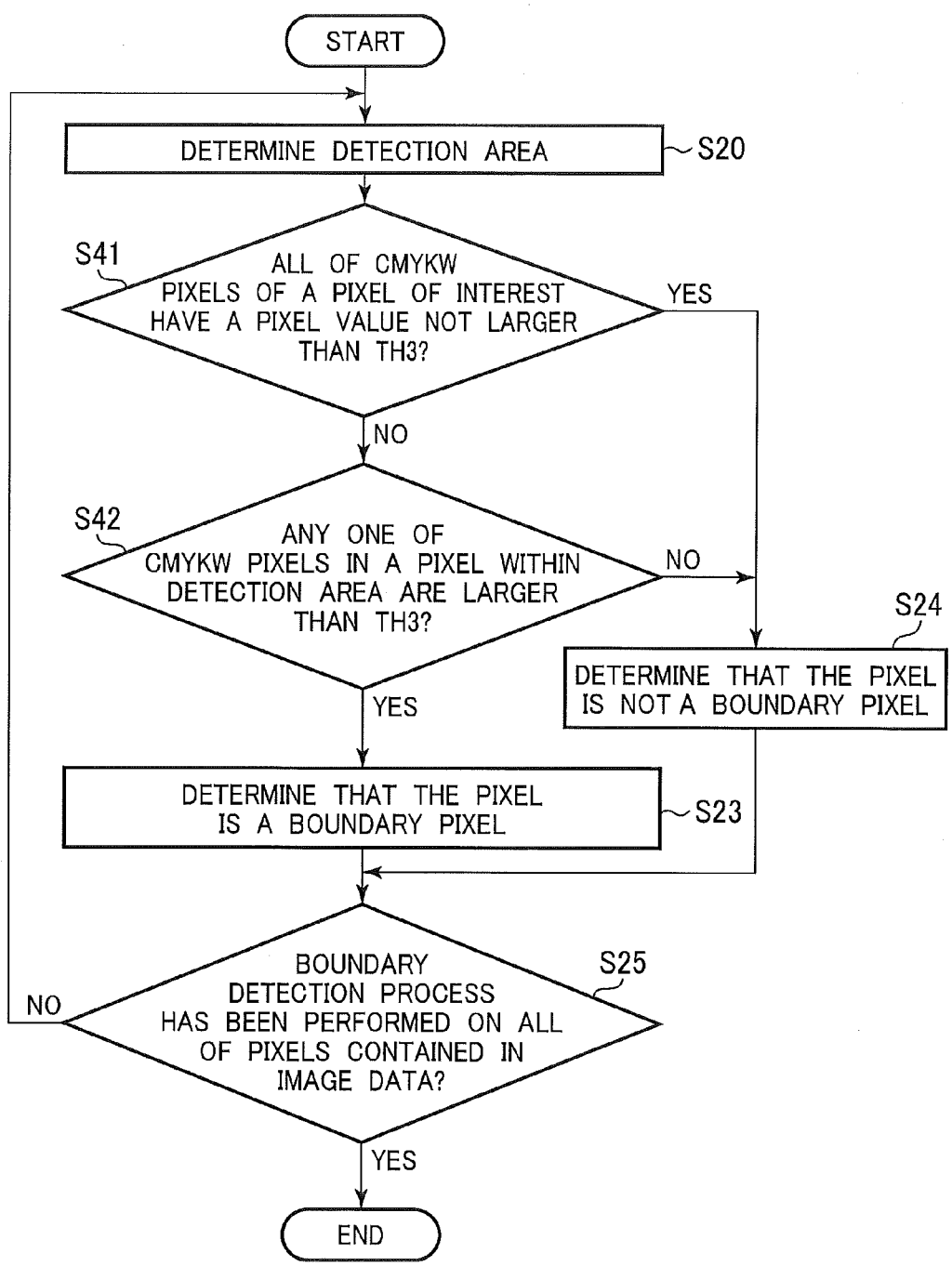

IMAGE PROCESSING APPARATUS, IMAGE FORMING APPARATUS, AND METHOD FOR PROCESSING IMAGES

BACKGROUND OF THE INVENTION

1. Field of the Invention

The present invention relates to an image processing apparatus, an image forming apparatus, and a method for processing images.

2. Description of the Related Art

Many of the color printers and multifunction printers (MFP) perform printing using toners of four toners: cyan, magenta, yellow, and black toners. In recent years, a toner having a color other than these four colors is used as a base color when images are printed on a variety of print media. In the printing industry, the subtractive primaries cyan, magenta, and yellow are applied together in varying amounts, thereby producing varying colors. For example, assume that the recording medium has a base color other than white or even transparent like a film. If an image is printed directly on the recording medium using these toners; the resultant image will not have a brightness value higher than the color of the base of the recording medium. Japanese Patent Publication No. 2010-152209 discloses a technique in which a white image is printed as a base color directly on a medium and then a color image is printed on the white base using the above-described four toners.

However, the printing technique disclosed by the above-described publication suffers from a drawback in that the position of images of the respective colors printed on the image of the base color (e.g., white) may shift relative to the base color image.

SUMMARY OF THE INVENTION

An object of the invention is to provide an image processing apparatus, an image forming apparatus, and a method for processing images in which the images of the respective colors printed on the image of a base color are prevented from shifting relative to the base color image.

An image processing apparatus prints an image without streaks on a medium. A receiving section receives base color image data and non-base color image data. A detecting section detects a boundary between a first area in which the base color image is formed and a second area which surrounds the first area and has not an image formed therein. A correcting section performs a correction process on the image data to generate one of a third area defined in a peripheral portion of the first area and a fourth area which is defined in a peripheral portion of the second area and is contiguous to the first area. A smaller amount of base color toner is consumed in the third and fourth areas than in the first area. A printing section prints an image on a medium in accordance with the base color image data and the non-base color image data after the correction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 14B is a cross-sectional view taken along a line 14B-14B in FIG. 14A;

FIG. 14C is a cross-sectional view taken along a line 14C-14C in FIG. 14A;

FIG. 15B is a cross-sectional view taken along a line 15B-15B in FIG. 15A;

FIG. 15C is a cross-sectional view taken along a line 15C-15C in FIG. 15A;

FIG. 16 is a flowchart illustrating the operation of the boundary detecting section;

FIG. 21B is a cross-sectional view taken along a line 21B-21B in FIG. 21A;

FIG. 21C is a cross-sectional view taken along a line 21C-21C in FIG. 21A;

FIG. 22B is a cross-sectional view taken along a line 21B-21B in FIG. 22A; and FIG. 22C is a cross-sectional view taken along a line 22C-22C in FIG. 22A.

DETAILED DESCRIPTION OF THE INVENTION

Figure 1:
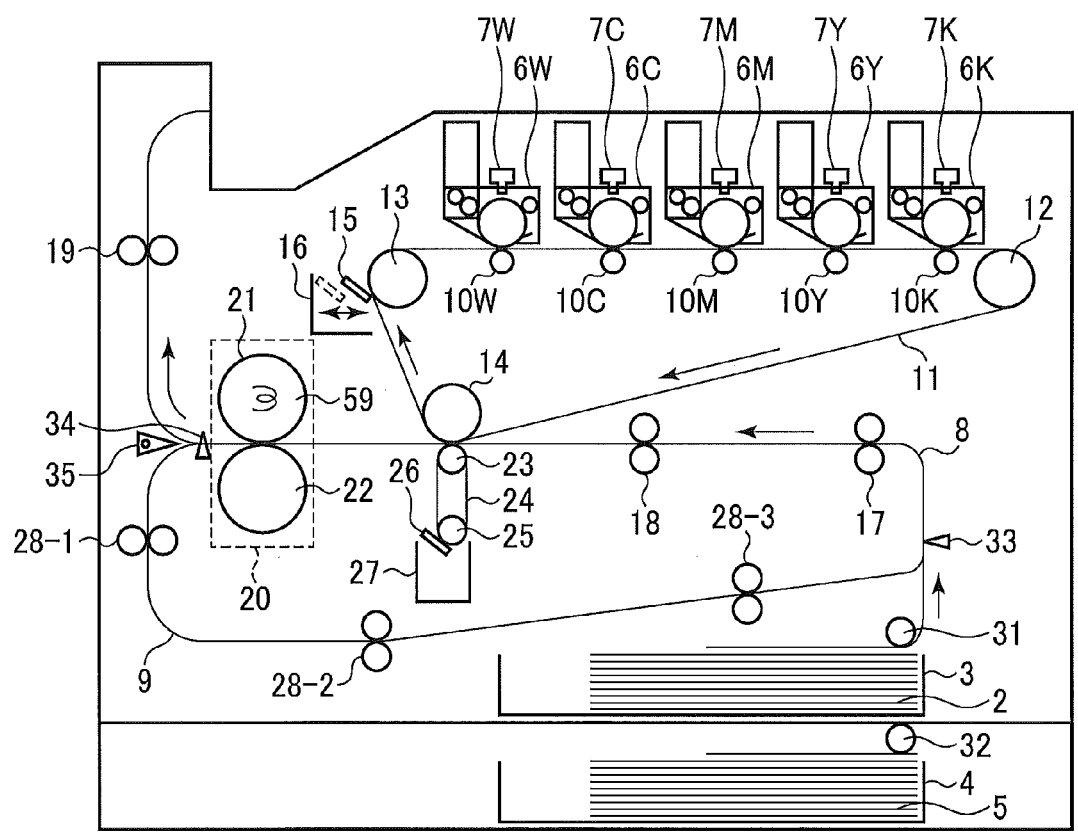
FIG. 1 illustrates the general configuration of a printer as an image processing apparatus according to first and second embodiments.

Embodiments of the invention will be described in detail with reference to the accompanying drawings in which like elements are indicated by like reference characters.

First Embodiment

{Configuration}

FIG. 1 illustrates the general configuration of a printer 1 as an image processing apparatus according to first and second embodiments. The printer 1 includes medium cassettes 3 and 4. The medium cassette 3 holds a stack of recording medium 2 therein. The medium cassette 4 holds a stack of recording medium 5 different from the recording medium 2.

The printer 1 is capable of printing color images, and therefore includes image drum (ID) units 6K, 6Y, 6M, and 6C that form black (K), yellow (Y), magenta (M), and cyan (C) images, respectively. The printer 1 also includes an additional image drum unit 6W that forms a white image, the white image serving as a solid base image that extends over the entire printable area of the medium. The ID units 6K, 6Y, 6M, 6C, and 6W are configured to form corresponding color images, and are detachably attached to the printer 1. The printer 1 also includes light emitting diode (LED) heads 7K, 7Y, 7M, 7C, and 7W that form corresponding electrostatic latent images, respectively.

An intermediate transfer belt 11 is disposed about a drive roller 12, a driven roller 13, and a secondary transfer back up roller 14, and is driven by the drive roller 12 to run. The intermediate transfer belt 11 is sandwiched between the primary transfer rollers 10K, 10Y 10M, 10O, and 10W and the ID units 6K, 6Y, 6M, 6C, and 6W, and runs in a direction shown by arrows. The toner images formed by the ID units 6K, 6Y, 6M, 6C, and 6W are transferred onto the intermediate transfer belt 11. The intermediate transfer belt 11 is an endless belt formed of a high-resistance semiconductive plastic film.

A cleaning blade 15 is disposed in the vicinity of the driven roller 13 and is in an abutting engagement with the outer surface of the intermediate transfer belt 11. The cleaning blade 15 scrapes the residual toner remaining on the intermediate transfer belt 11. The residual toner scraped off by the cleaning blade 15 falls into a waste toner reservoir 16. The cleaning blade 15 is configured to move in directions shown by arrows between the solid line position and the dotted line position.

A secondary transfer belt 24 is disposed about a secondary transfer roller 23 and a drive roller 25, and is driven by the drive roller 25 to run. The secondary transfer roller 23 is disposed to face the secondary back up roller 14, and the secondary transfer belt 24 receives the toner image from the intermediate transfer belt 11. The recording medium 2 or 5 passes through a transfer point defined between the secondary transfer roller 23 and the secondary transfer back up roller 14, so that the toner image is transferred onto the recording medium 2 or 5. The secondary transfer belt 24 is an endless belt formed of a high-resistance semiconductive plastic film. A cleaning blade 26 is in an abutment engagement with the drive roller 25, and scrapes the residual toner remaining on the secondary transfer belt 24. The residual toner scraped off the secondary transfer belt 24 falls into a waste toner reservoir 27.

A hopping roller 31 cooperates with a separator (not shown) to feed the recording medium 2 on a sheet-by-sheet basis into a transport path 8. The recording medium 2 is fed by transport rollers 17 and 18 at a predetermined timing to a transfer point (nip) defined between the intermediate transfer belt 11 and the secondary transfer belt 24. The recording medium 5 is also fed by transport rollers 17 and 18 at a predetermined timing to the transfer point (nip) defined between the intermediate transfer belt 11 and the secondary transfer belt 24.

A fixing unit 20 includes a heat roller 21 and a pressure roller 22. When the recording medium 2 or 5 passes through a fixing point defined between the heat roller 21 and the pressure roller 22, the toner image on the recording medium 2 or 5 is fixed by heat and pressure into a permanent image. After fixing, the recording medium 2 or 5 is discharged to the outside of the printer 1 or fed into a re-transport path 9. The recording medium 2 or 5 is transported by re-transport rollers 28-1, 28-2, and 28-3 disposed along the re-transport path 9, and is then advanced into the transport path 8 again. The write sensor 33 and a discharge sensor 34 mechanically senses the recording medium 2 or 5 every time the recording medium 2 or 5 passes the sensors 33 and 34.

Figure 2:
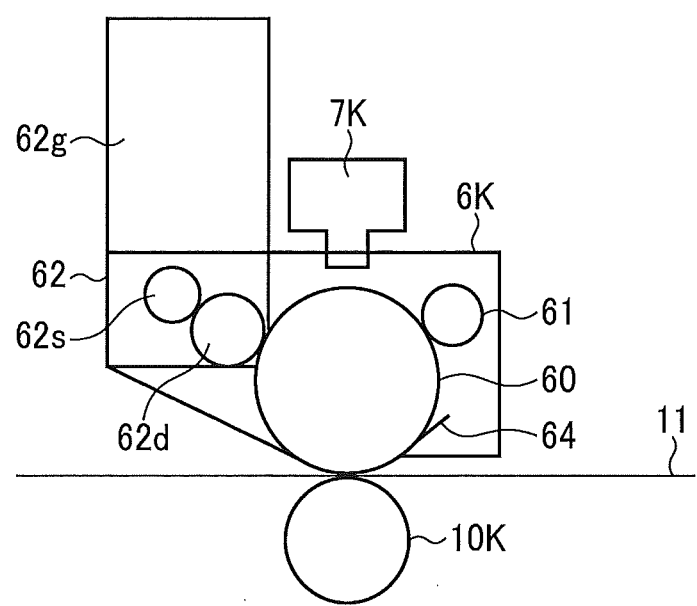
FIG. 2 illustrates the configuration of an ID unit.

FIG. 2 illustrates the configuration of the ID unit 6K. The ID units 6K, 6Y, 6M, 6C, and 6W are identical in configuration and therefore a description will be given only of the ID unit 6K. The ID unit 6K includes a photoconductive drum 60 as an image bearing body on which an electrostatic latent image is formed, and a charging roller 61 that uniformly charges the surface of the photoconductive drum 60. The LED head 7K illuminates the charged surface of the photoconductive drum 60 to form an electrostatic latent image thereon.

The ID unit 6K also includes a developing mechanism 62. The developing mechanism 62 includes a developing roller 62d on which a black toner image is formed, a supplying roller 62s that supplies the black toner to the developing roller 62d and triboelectrically charges the black toner, and a toner cartridge 62g that holds the black toner therein. The ID unit 6K transfers a toner image formed on the photoconductive drum onto the intermediate transfer belt 11. The toner cartridge 62g is detachably mounted on the developing mechanism 62. The ID unit 6K also includes a cleaning blade 64 that scrapes the residual toner from the photoconductive drum 60.

Figure 3:
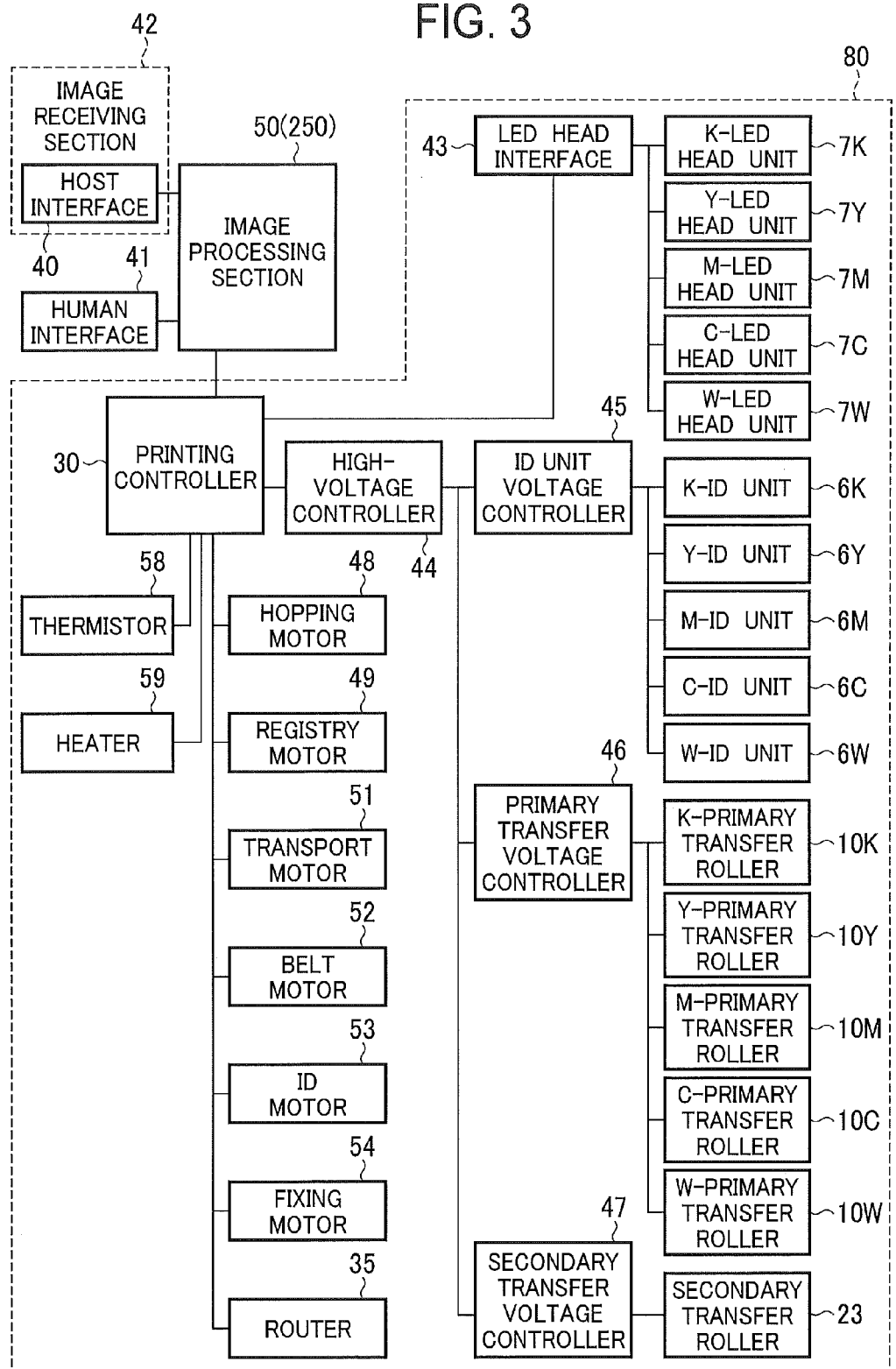
FIG. 3 is a control block diagram for the first and second embodiments.

FIG. 3 is a control block diagram for the first and second embodiments. The reference numerals shown in the parentheses denote structural elements of the second embodiment. A host interface 40 provides a physical interface between the host computer and the printer 1. For example, the host interface 40 functions as an image receiving section 42 through which image data for forming an image is received. The user communicates with the printer 1 via a human interface 41. The human interface 41 may be built in the printer 1 or may be a separate unit connected to the printer 1. An image processing section 50 transmits and receives data through the host interface 40, and processes information obtained through the host interface 40 and human interface 41.

The image processing section 50 interprets commands and the image data, and then renders the image data into bit map data, and finally outputs the bit map data to a printing controller 30. The LED head interface 43 converts the image data (bit map data) from the image processing section 50 into data that can drive the LED heads 7K, 7Y, 7M, 7C, and 7W.

An image outputting section 80 prints the data produced by the image processing section 50. The configuration of the image outputting section 80 will be described below.

A printing controller 30 parses information signals received from the respective sensors and sections, and performs operations on the information and signals, and makes decisions based on the results of the operations. The printing controller 30 then outputs instruction signals to the LED head interface 43 and the respective sections, thereby centrally controlling the mechanical sections and voltages applied to the respective sections. The printing controller 30 drives a hopping motor 48, a registry motor 49, a transport motor 51, a belt motor 52, an ID motor 53, and a fixing motor 54 at predetermined timings and speeds. The printing controller 30 also selectively drives a drive means (not shown) for a router 35.

The thermistor 58 detects the surface temperature of the heat roller heated by a heater 59, and the printing controller 30 controls the current flowing through the heater 59 in accordance with the detected temperature. A high-voltage controller 44 receives control data from the printing controller 30, and controls the voltages applied to the respective sections in accordance with the control data. An ID unit voltage controller 45 controls the voltages applied to the ID units 6K, 6Y, 6M, 6C, and 6W. A primary transfer voltage controller 46 controls the voltages applied to the primary transfer rollers 10K, 10Y, 10M, 10O, and 10W. A secondary transfer voltage controller 47 controls the voltage applied to the secondary transfer roller 23.

Figure 4:
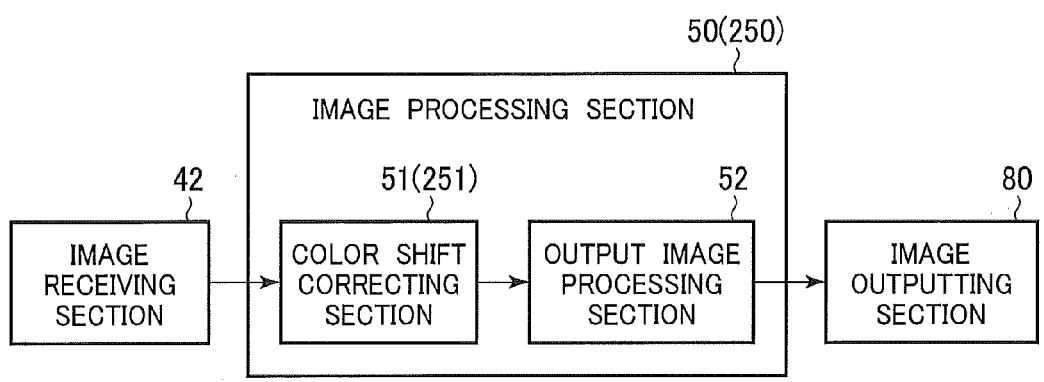
FIG. 4 is a schematic block diagram illustrating the configuration of an image processing section.

FIG. 4 is a schematic block diagram illustrating the configuration of the image processing section 50. The image processing section 50 includes a color shift correcting section 51 and an output image processing section 52. The image processing section 50 processes the image data received from the image receiving section 42, and then outputs the processed data to the image outputting section 80. The reference numerals shown in parentheses denote elements in the second embodiments.

The printer 1 according to the first embodiment processes the image data received through the image receiving section 42, and outputs the processed image.

The image receiving section 42 sends the image data for five colors, i.e., black, yellow, magenta, cyan, and white to the image processing section 50. In the first embodiment, white is used as a base color. When the pixels of cyan, magenta, yellow, and black have pixel values equal to or greater than "0," the white pixels also have a pixel value equal to or greater than "0." The image data in the invention describes pixels of cyan, magenta, yellow, and black pixels whose pixel values are rated on a scale of 0 to 255. The value "0" means that a pixel has a pixel value smaller than a minimum pixel value that can be printed on the recording medium. In other words, the pixel is not printed. One or more of the black, yellow, magenta, cyan, and white are printed one over the other to form a single composite pixel.

The image outputting section 80 outputs the image data processed by the image processing section 50. The image outputting section 80 takes the form of, for example, an electrophotographic printer that forms a toner image on the surface of the recording medium and fixes the toner image, thereby printing the image. The cyan, magenta, yellow, black images are formed on the white, image. Alternatively, the recording medium according to the first embodiment may be white or may be other color than white.

Figure 5:
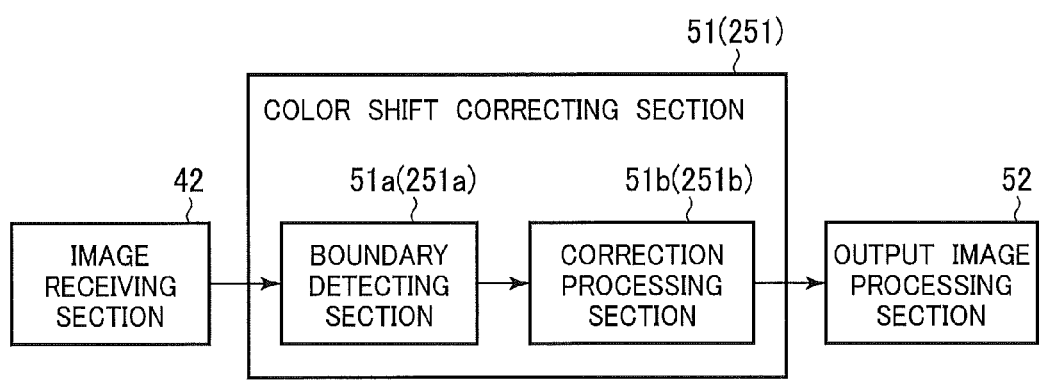
FIG. 5 is a schematic block diagram illustrating a color shift correcting section.

FIG. 5 is a schematic block diagram illustrating the color shift correcting section 51. The color shift correcting section 51 includes a boundary detecting section 51*a* and a correcting section 51*b*. The reference numerals shown in parentheses denote elements in the second embodiment.

The boundary detecting section 51*a* detects the boundary between a color area in which an image of a base color (e.g., white) is printed and at least one of cyan, magenta, yellow, and black is printed on the image of the base color, and a non-color area in which no image of the base color, cyan, magenta, yellow, and black is printed. The boundary is the edge of the color area. A boundary area is a peripheral portion of the color area, and is contiguous to the non-color area. The pixels in the boundary area are boundary pixels, and are detected by the boundary detecting section 51*a*. The boundary detecting section 51*a* provides boundary detection data and image data for cyan, magenta, yellow, black and white images to a correction processing section 51*b*. The boundary detection data takes the form of binary data. Pixels having a binary value of "1" are boundary pixels. Pixels having a binary value "0" are non-boundary pixels.

The correction processing section 51*b* performs color shift correction on the boundary pixels using the image data for cyan, magenta, yellow, black, and white images, and outputs the corrected image data to the output image processing section 52. For example, the correction processing section 51*b* corrects the image data by creating a third area in a peripheral portion of the color area or first area, and the non-color area or second area. The amount of base color toner used is zero in the third area. Alternatively, the correction may be made such that the amount of base color toner used may also be smaller in the third area than in the color area.

Referring back to FIG. 4, the output image processing section 52 reduces the number of grayscale levels of the pixel values of the cyan, magenta, yellow, black and white images using gray level correction, dithering, or error diffusion method. The output image processing section 52 then outputs the image data having the reduced number of grayscale levels to an image outputting section 80.

The respective operations in the image processing section 50 are implemented by the programs stored the printer 1. These programs may be stored in a non-volatile memory, a hard disk drive, a volatile memory, or other types of magnetic storage media (not shown). The image data, boundary detection data, threshold values, settings, and other data produced during the respective processes within the printer 1 are stored in a non-volatile memory, a hard disk drive, or other magnetic storage medium (not shown), and may be deleted after completion of the processes.

{Operation}

In the first embodiment, the color area and the non-color area are detected. The area occupied by the base color (e.g., white) in the color area is then shrunk by removing a peripheral portion of the area occupied by the base color, thereby preventing a streak of the base color image due to color shift of the base color image. This color shift correction is effective in preventing deterioration of print quality.

Figure 6:
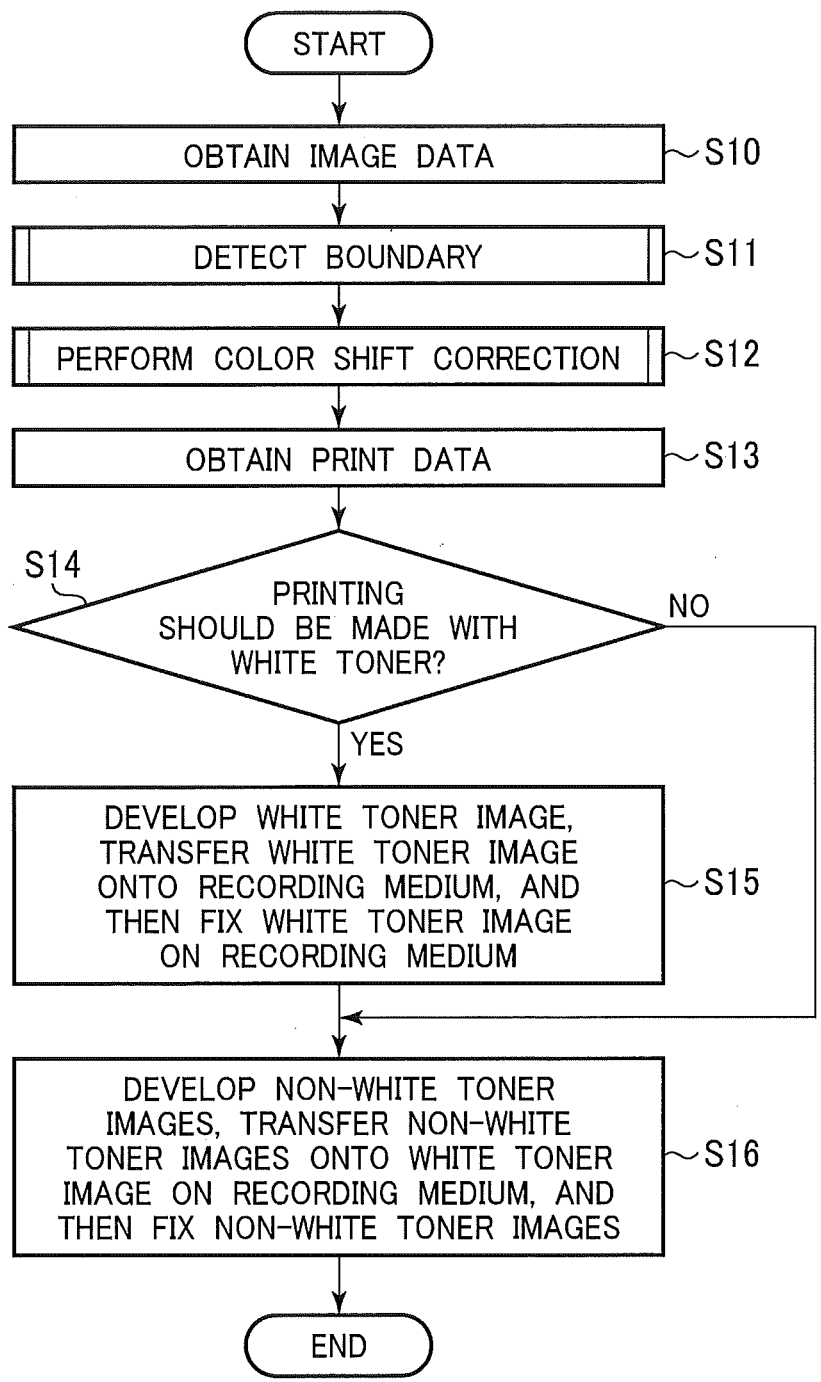
FIG. 6 is a flowchart illustrating the operation of the printer.

FIG. 6 is a flowchart illustrating the operation of the printer 1.

The image processing section 50 receives medium information and settings for a printing operation from the host interface 40 and the human interface 41, respectively, and sends the information and settings to the print controller 30. The image processing section 50 obtains image data for the printing operation from the interface 40 (S10).

The boundary detecting section 51*a* of the image processing section 50 performs a boundary detection process to detect the boundary between the color area and non-color area based on the image data obtained at S10 (S11). The process will be described later in more detail with reference to FIG. 7. The boundary detecting section 51*a* sends the image data and boundary detection data to the correction processing section 51*b*.

The correction processing section 51*b* obtains the image data and boundary detection data from the boundary detecting section 51*a*, and performs color shift correction on the image data based on the boundary detection data (S12). The correction will be described later in more detail with reference to FIG. 12. The correction processing section 51*b* outputs corrected image data to the output image processing section 52.

The output image processing section 52 produces print data (image forming data) that contains corrected image data obtained from the correction processing section 51b. The output image processing section 52 outputs the print data to the printing controller 30 (S13).

The printing controller 30 makes a decision based on the print data received from the output image processing section 52 to determine whether printing should be made on the recording medium with the white toner (S14). If the printing should be performed with the white toner (YES at S14), the program proceeds to S15. If the printing should not be performed with the white toner (NO at S14), the program proceeds to S16. Alternatively, the printing controller 30 may be configured to determine that printing need not be performed with the white toner if the recording medium is white.

At S15, the printing controller 30 sends control values to the respective controllers in accordance with the received print data, so that an image of white toner is formed, then developed, and finally transferred onto the recording medium 2 or 5. The printing controller 30 then drives the router 35 and the re-transport rollers 28-1, 28-2, and 28-3 to transport the recording medium 2 or 5 back to the transfer point defined between the secondary transfer roller 23 and the secondary transfer back up roller 14.

At S16, the printing controller 30 sends the control values to the respective controllers 45, 46, and 47, thereby causing the ID units 6K, 6Y, 6M, and 6C to form black, yellow, magenta, and cyan toner images and then to transfer the black, yellow, magenta, and cyan toner images in this order onto the white image formed on the recording medium 2 or 5. The images are then fixed in the fixing unit 20. The printing controller 30 drives the transport motor 53 to rotate the discharge roller 19 (S16).

Figure 7:
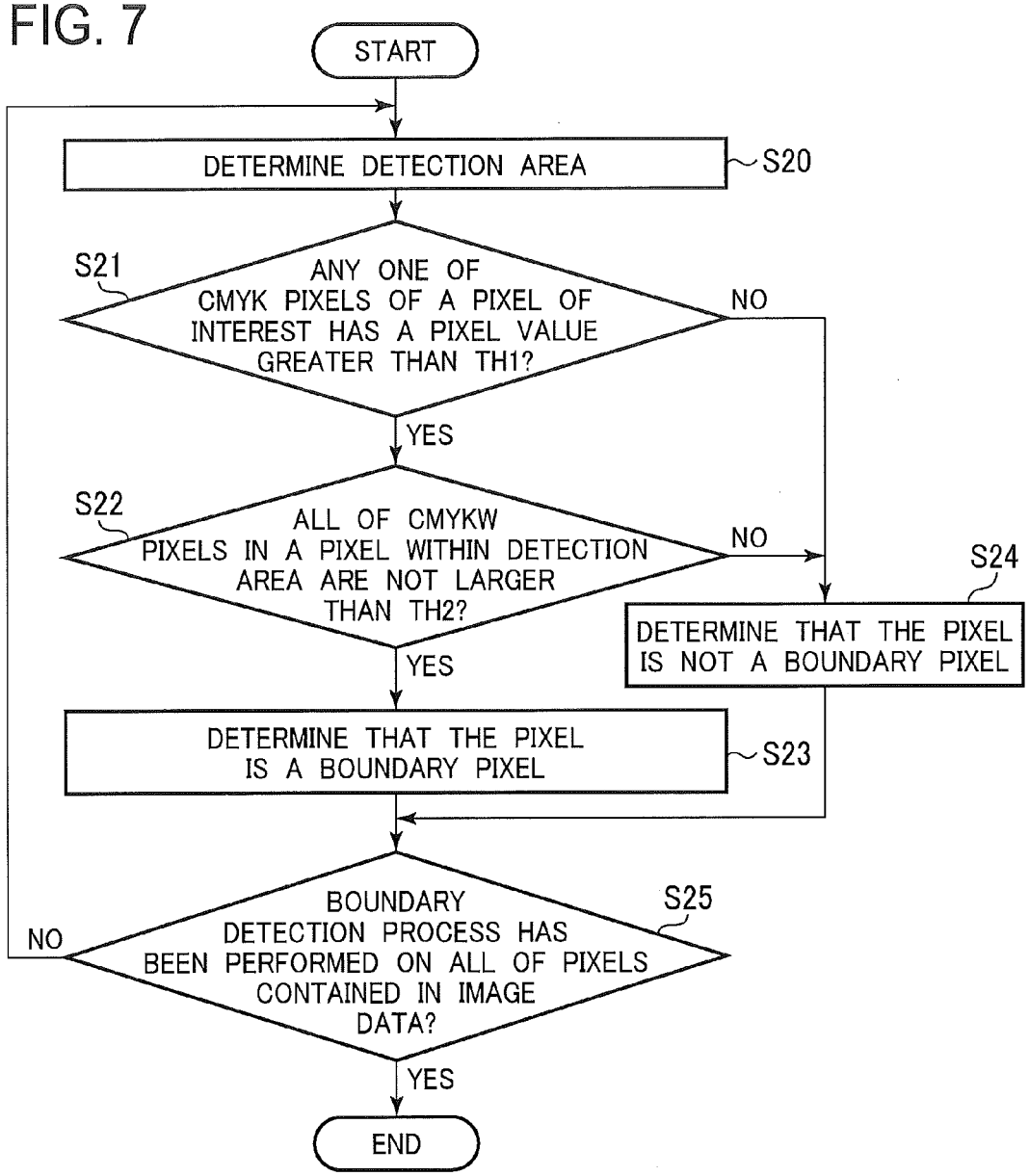
FIG. 7 is a flowchart illustrating the operation of a boundary detecting section according to the first embodiment.

FIG. 7 is a flowchart illustrating the operation (S11 of FIG. 6) of the boundary detecting section 51a according to the first embodiment. The boundary detecting section 51a defines a detection area when the boundary between the color area and the non-color area is detected (S20). Defining the detection area is equivalent to determining the number of pixels which are away from the boundary and whose color shift should be corrected. In other words, the boundary area is defined in terms of the number of pixels from the edge of the color area. The size of boundary area varies with the positional accuracy of pixels printed with the printer 1, and may be set by default or by the user.

Figure 8:
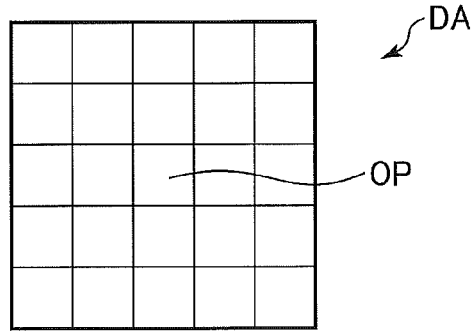
FIG. 8 is the schematic diagram of an exemplary detection area.

Assume that the boundary area is as wide as two pixels from the boundary and color shift correction is performed on the pixels in the boundary area. FIG. 8 is a schematic diagram of an exemplary detection area DA. Each square in the detection area DA represents a pixel. Consider that the detection area DA consists of "2n+1" rows of pixels and "2n+1" columns of pixels, $n$ being an integer. For example, $n$ is 2 in the first embodiment so that the detection area DA has 25 pixels: 5 pixels in each row and 5 pixels in each column. Thus, the $n$ indicates the number of pixels that define the boundary area on which color shift correction should be performed. For n=2, two pixels from the boundary define the boundary area.

Referring back to FIG. 7, the boundary detecting section 51a checks the cyan, magenta, yellow and black pixels of interest to determine whether any one of cyan, magenta, yellow, and black pixels of interest has a pixel value larger than a first threshold value TH1 (S21). In other words, at S21, a check is made to determine whether a pixel of interest is within the color area. The cyan, magenta, yellow, and black images have an identical number of pixels arranged in matrix form such that the pixels of the cyan, magenta, yellow, and black images are printed one over the other. Therefore, each pixel contains a maximum five color pixels: white, cyan, magenta, yellow, and black. An image IM (FIG. 9) described by the image data may be a full-color photograph, in which case not all of the cyan, magenta, yellow, and black pixels may be present at each position of pixel. In other words, there may be pixel positions where one or more of the cyan, magenta, yellow, and black pixels may be missing. When at least one of the cyan, magenta, yellow, and black pixels is to be printed on the white pixel in a pixel, if color shift has occurred so that the position of the white pixels are shifted relative to those of the cyan, magenta, yellow, and black pixels in the pixel, the shift of the white pixel should be corrected.

When none of the cyan, magenta, yellow, and black pixels is to be printed on the white pixel in a pixel, even if the pixel is a boundary pixel and color shift has actually occurred, the white pixel has nothing to do with a possible white streak and is in fact a white pixel necessary to be printed as a part of the image. In order for a pixel of interest to be a boundary pixel, the pixel of interest must satisfy two criteria. First, the pixel values of cyan, magenta, yellow, black, and white pixels are large, i.e., the pixel of interest is within the color area. This is checked at S21. Second, all of the cyan, magenta, yellow, black and white pixels in a pixel position within the detection area DA are very small (e.g., "0"), i.e., the pixel of interest is within the boundary area. This is checked at S22. Thus, at S21, it is not necessary to check whether the white pixel has a pixel value greater than the first threshold TH1 (e.g., 15). Thus, at S21, it is not necessary to check whether the pixel value of the white pixel of a pixel of interest is smaller than the first threshold TH1.

If the answer is YES at S21, the program proceeds to S22. If the answer is NO at S21, the program proceeds to S24. The first threshold TH1 is a pixel value above which a pixel is determined as a color pixel. The first threshold TH1 is selected to be equal to or larger than "1," and is "15" in the present embodiment. Alternatively, different thresholds may be selected for different colors: cyan, magenta, yellow and black.

At S22, the boundary detecting section 51a checks the pixel value of each pixel in the detection area DA to determine whether all of the cyan, magenta, yellow, black and white pixels in the pixel is equal to or smaller than a second threshold TH2. If at least one pixel has cyan, magenta, yellow, black, and white pixels equal to or smaller than the second threshold TH2 (YES at S22), the program proceeds to S23. If none of the pixels in the detection area DA is equal to or smaller than the second threshold TH2 (NO at S22), the program proceeds to S24. The second threshold TH2 is a value below which a pixel is a non-color pixel, and is a pixel value of "0," which implies that a pixel value is smaller than a minimum value that can be printed on the recording medium. In other words, the pixel value of "0" is a minimum gradation level. Alternatively, different thresholds may be selected for different colors: cyan, magenta, yellow, black, and white.

At S23, the boundary detecting section 51a assigns a binary value of "1" to a pixel of interest of the boundary detection data, and determines that the pixel of interest is a boundary pixel. The program then proceeds to S25. At S24, the boundary detecting section 51a assigns a binary value of "0" to the pixel of interest of the boundary detection data, and determines that the pixel of interest is not a boundary pixel. The program then proceeds to S25.

At S25, the boundary detecting section 51a makes a decision to determine whether the boundary detection process has been performed on all of the pixels contained in the obtained image data. If the answer is NO at S25, the program jumps back to S20. If the answer is YES at S25, the program ends.

The process shown in FIG. 7 will be described with reference to FIGS. 9-11.

Figure 9:
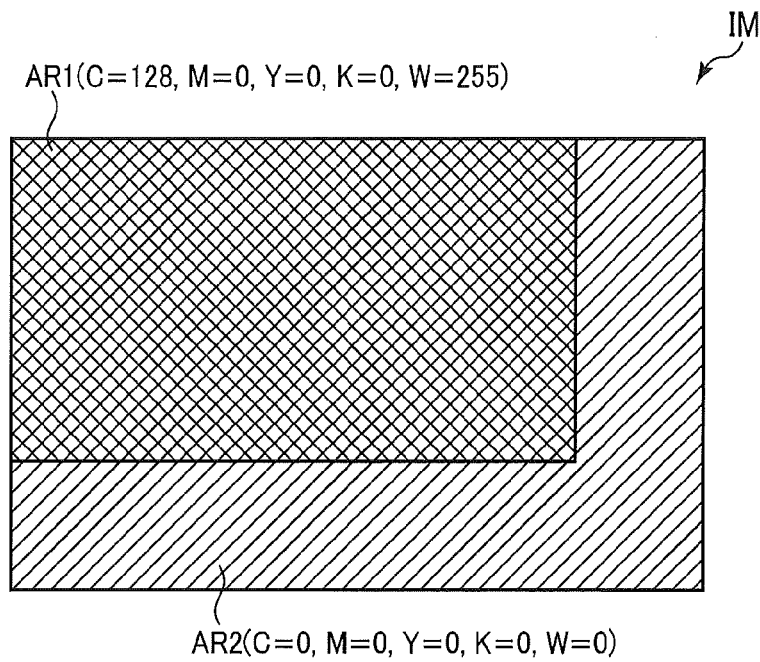
FIG. 9 illustrates an example of an image described by image data before the image is printed.

FIG. 9 illustrates a simple example of an image IN described by the image data before the image IN is printed.

The image IM is such that a white solid image is printed on the recording medium and then a cyan image is printed on the white solid image. The image IM has an area AR1 and an area AR2. In the area AR1, cyan pixels have a pixel value of "128," white pixels have a pixel value of "255," and magenta, yellow, and black pixels have a pixel value of "0." The area AR1 is a color area in which cyan pixels and white pixels are at the same positions when printed on the recording medium. The area AR2 is a non-color area in which all of the cyan, magenta, yellow, black and white pixels have a pixel value of "0," and therefore none of the cyan, magenta, yellow, black, and white pixels is present on the recording medium. In this specification, the pixels in the area AR2 are termed fictitious pixels. Thus, in the area AR2, the surface of the recording medium is directly exposed. FIG. 10 illustrates an image IM (FIG. 9) in which the detection area DA is defined at S20 shown in FIG. 7. A certain pixel contained in the image data is identified as a pixel of interest, OP. The detection area DA has five pixels in each column and five pixels in each row, the pixel of interest being at the center of the detection area DA. The detection area DA contains fictitious pixels Pf in the area AR2. The process determines the fictitious pixels as non-color pixels, which do not contribute to the formation of the image IM.

Figure 10:
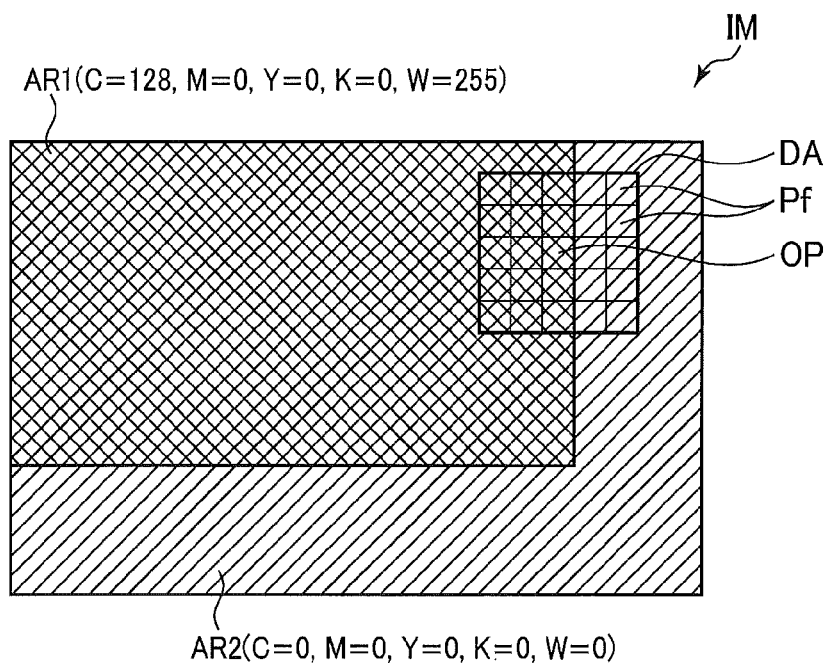
FIG. 10 illustrates the image in which the detection area is defined at S20 shown in FIG. 7.

At S21 in FIG. 7, assume that the first threshold TH1 is set to "15." Referring to FIG. 10, the pixel of interest, OP, is in the area AR1, and therefore the cyan pixels have a pixel value of "128" and the white pixels have a pixel value of "255," which are larger than the first threshold TH1. Thus, the answer is YES at S21 shown in FIG. 7, and the program proceeds to S22.

At S22 in FIG. 7, assume that the second threshold TH2 is "0," which is a pixel value smaller than a minimum pixel value that can be printed on the recording medium. Referring to FIG. 10, fictitious pixels in the second area AR2 are present in the detection area DA, and it can be said that fictitious pixels in the detection area DA have a pixel value equal to or smaller than the second threshold TH2. Thus, the answer at S22 is YES, and the program proceeds to S23 where it is determined that the pixel of interest, OP, is a boundary pixel.

Figure 11:
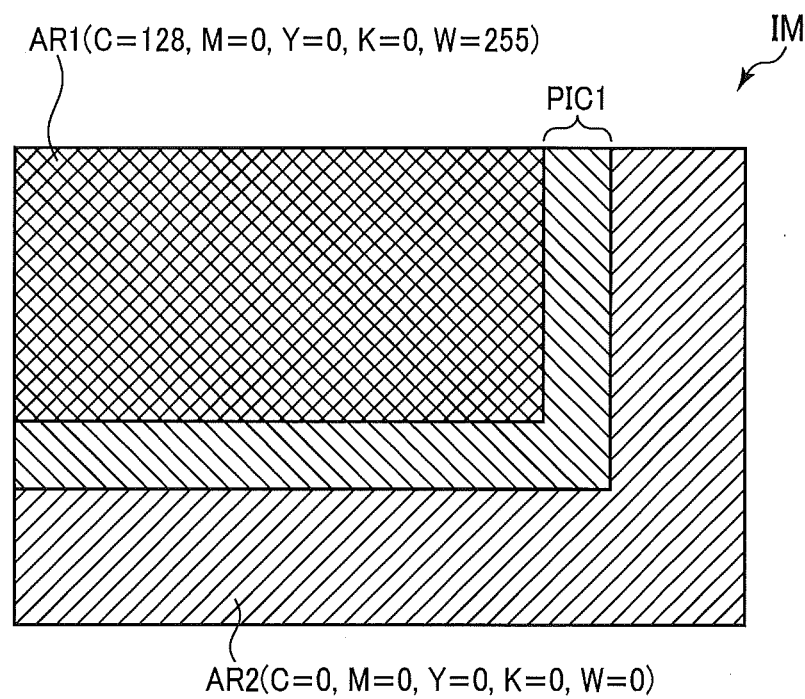
FIG. 11 illustrates the outline of a boundary detection process performed on the image in accordance with the flowchart shown in FIG. 7.

FIG. 11 illustrates the outline of the boundary detection process performed on the image IN shown in FIG. 9 in accordance with the flowchart shown in FIG. 7. The boundary detection process detects two pixels, PIC1, in the first area AR1, the two pixels being boundary pixels. The boundary pixels define the boundary area. The boundary detecting section 51a produces the boundary detection data that describes the boundary pixels (two pixels PIC1 in the first area AR1) with a binary value of "1" and the other pixels having a binary value of "0."

The boundary detecting section 51a according to the first embodiment detects the boundary by comparing the pixel values. Detection of boundary is not limited to this method. For example, the boundary may also be detected by the size of edge data calculated based on the difference in pixel value between the image described by the obtained image data and the image obtained by performing a smoothing process on the obtained image data.

Figure 12:
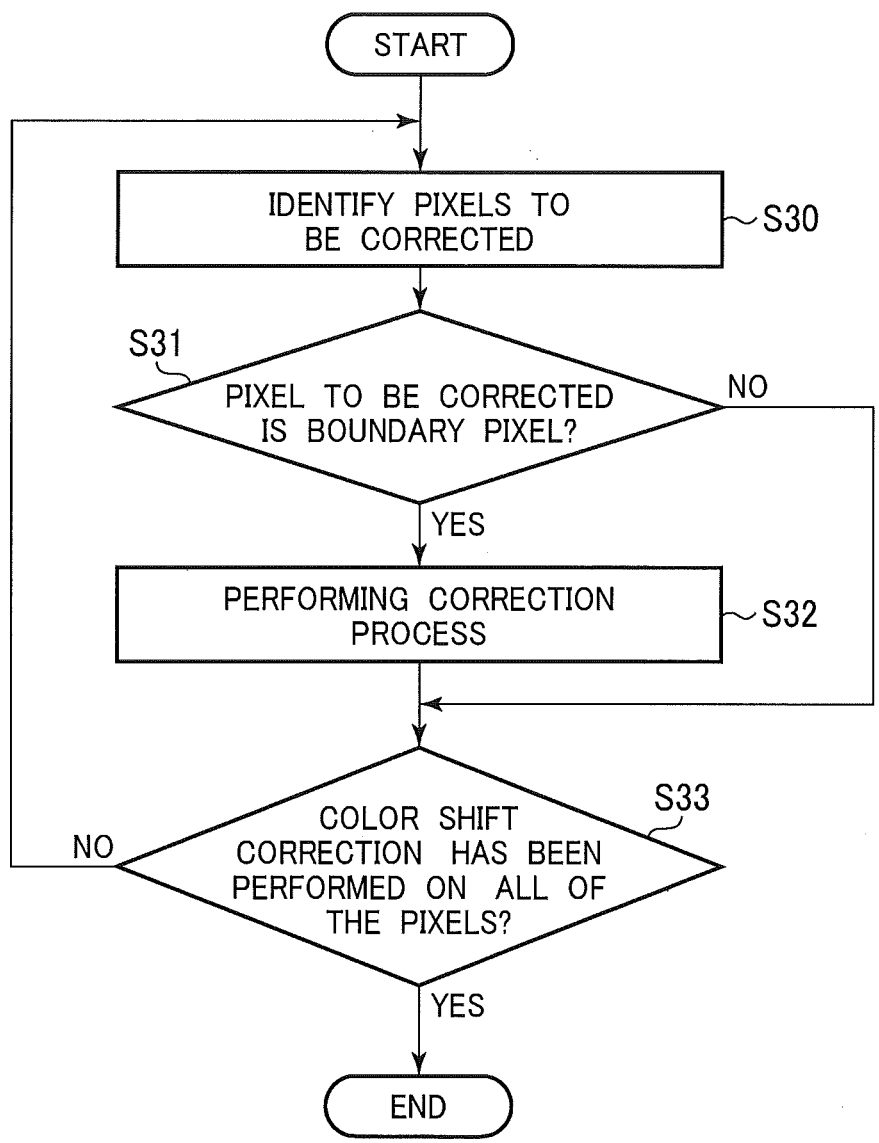
FIG. 12 is a flowchart illustrating the operation of a correction processing section.

FIG. 12 is a flowchart illustrating the operation of the correction processing section 51b, explaining the detail of S12 shown in FIG. 6. The correction processing section 51b identifies pixels to be corrected, which are described by the image data received from the boundary detecting section 51a and have not been subjected to color shift correction yet (S30).

Next, the correction processing section 51b makes a decision, based on the boundary detection data received from the boundary detecting section 51a, to determine whether the pixel to be corrected is a boundary pixel (S31). If the answer is YES at S31, the program proceeds to S32. If the answer is NO at S31, then the program proceeds to S33.

At S32, the correction processing section 51b replaces the pixel value of a white pixel to be corrected with a pixel value not indicative of a white toner, thereby performing the correction process on the white pixel to be corrected. A pixel not indicative of a white toner may be assigned a pixel value of, for example, "0". Alternatively, the pixel value of a white pixel to be corrected may also be replaced with an average pixel value of white pixels in the detection area or another area that includes the white pixel to be corrected.

At S33, the correction processing section 51b makes a decision to determine whether the color shift correction has been performed on all of the pixels contained in the obtained image data. If the answer is NO at S33, the program jumps back to S30. If the answer is YES at S33, the program ends.

Figure 13:
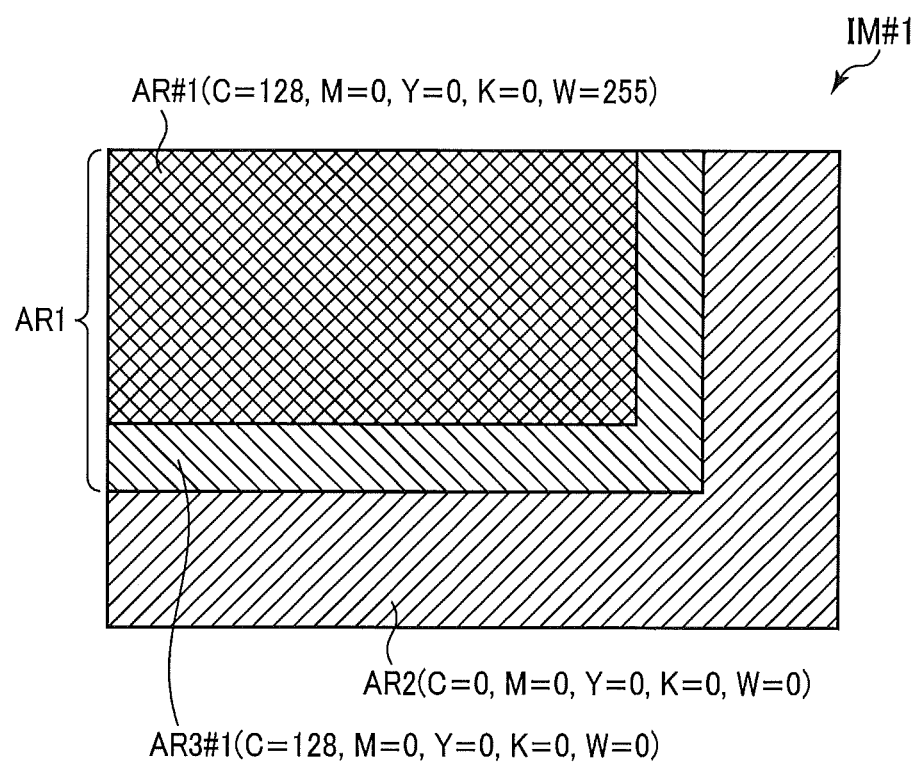
FIG. 13 illustrates the results of the color shift correction performed on the image.

FIG. 13 illustrates the results of the color shift correction performed on the image IM shown in FIG. 9. The image IM#1 contains an area AR1#1 and an area AR3#1. The pixels in the area AR1#1 have the same pixel value as those in the area AR1 shown in FIG. 9. The area AR3#1 is located between the area AR#1 and the area AR2. The area AR#1 is created by reducing the coor area AR1 for white. In the area AR3#1, white pixels have a pixel value of "0," which implies that there is no white pixels. The area AR3#1 is an area or third area in which pixels having the color of the base image (i.e., white) are not printed.

When the cyan, magenta, yellow, and black images are printed on the white image, if color shift has occurred in the white image for some reason, the white image in the form of a streak appears in an area between the color area and non-color area, causing poor print quality.

Figure 14A:
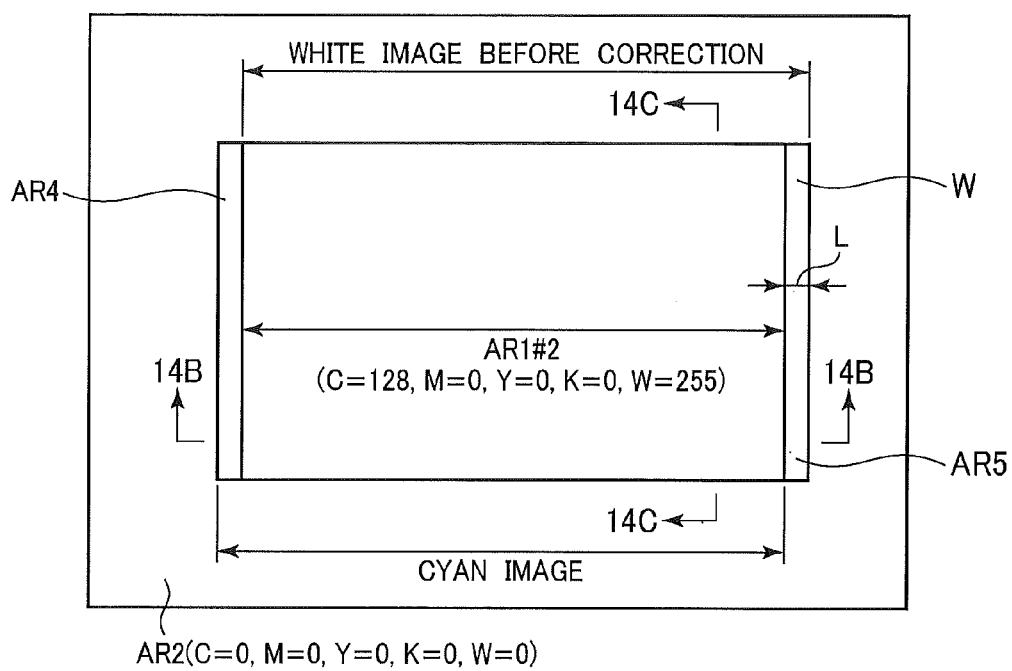
FIGS. 14A-14C illustrate an example of color shift that has occurred in the image shown in FIG. 9.
Figure 14B:
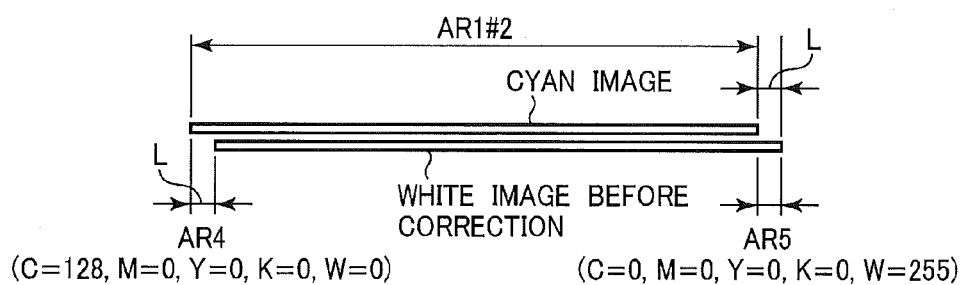
Figure 14C:
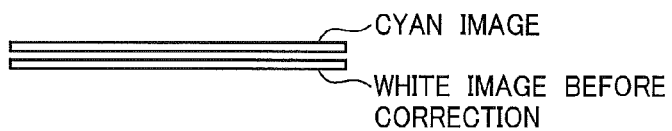

FIGS. 14A-14C illustrate an example of color shift that has occurred in the image IM shown in FIG. 9. FIG. 14B is a cross-sectional view taken along a line 14B-14B in FIG. 14A. FIG. 14C is a cross-sectional view taken along a line 14C-14C in FIG. 14A. In this example, a solid white image is formed on the recording medium and then a solid cyan image is formed on the solid white. Note that color shift has occurred in a white image, shifting the white image by one pixel rightward. The undesired color shift results in an area AR4 (FIG. 14B) to the left of an area AR1#2 and an area AR5 to the right of the area AR1#2. The area AR5 (FIG. 14B) contains white pixels only. The pixels in the area AR4 are cyan pixels only. The pixels in the area AR4 have the same color, i.e., cyan, as those in the area AR1#2, but have only slightly lower pixels values. The area AR2 in FIG. 14A is an area in which the recording medium is directly exposed. The area AR5 have white pixels only, and therefore the pixels in the area AR5 form a white streak between the area AR1#2 and AR2, causing poor print quality.

Figure 15A:
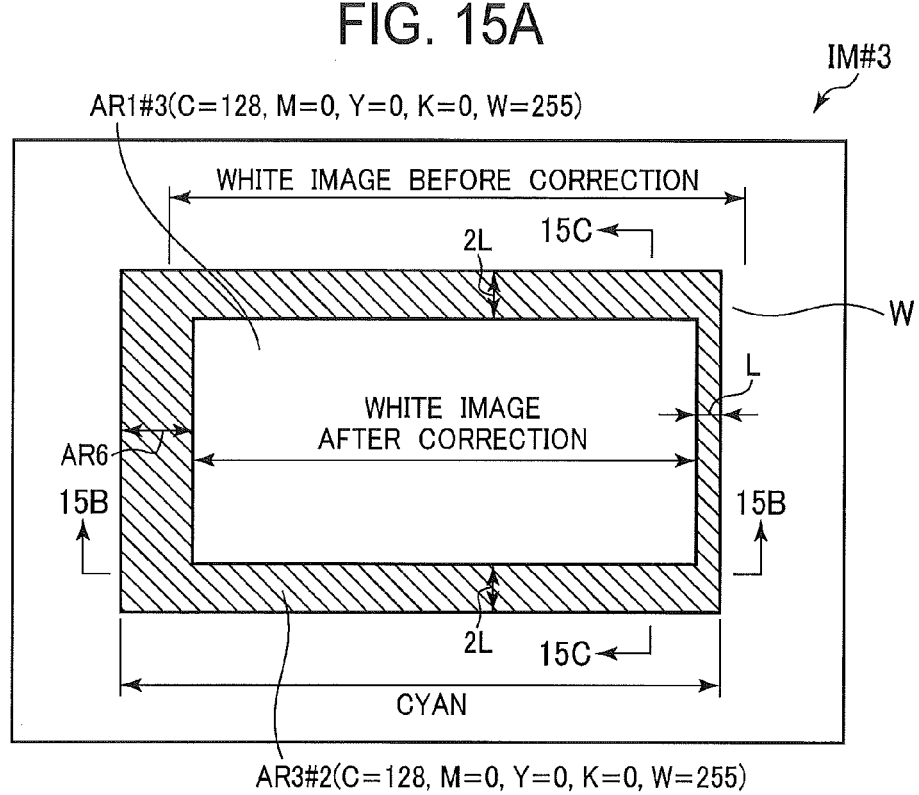
FIGS. 15A-15C illustrate an example of the image shown in FIG. 9 after performing the color shift correction.
Figure 15B:
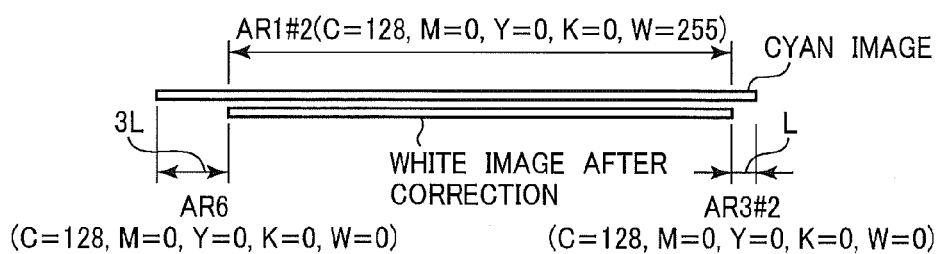
Figure 15C:
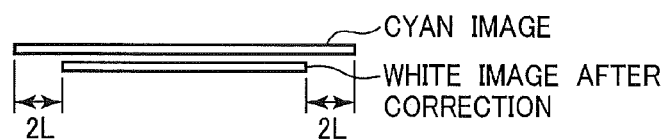

FIGS. 15A-15C illustrate an example of the image IM shown in FIG. 9 after performing color shift correction. FIG. 15B is a cross-sectional view taken along a line 15B-15B in FIG. 15A. FIG. 15C is a cross-sectional view taken along a line 15C-15C in FIG. 15A. Note that a white image has shrunk leftward by one pixel due to the color shift correction. As a result of color shift correction, the white image is reduced by a distance 2L in four directions (left, right, top, and bottom) creating an area AR3#2 (hatched area) contiguous with the area AR1#3 in which the pixels have the same pixel value as those in the area AR1 in FIG. 9. The color shift correction also results in an area AR6 to the left of the area AR1#3, the area AR6 containing cyan pixels only, and does not result in a white-only area to the right of the area AR1#3. Thus, the color shift correction successfully eliminated a white-only area which would otherwise appear to the right of the area AR1#3. In this manner, the color shift shown in FIG. 14A can be corrected so that no white streak appears to the left of the area AR1#3. The pixels in the areas AR1#2 (FIG. 14A) and AR3#2 are cyan, and therefore the AR3#2 is not detectable.

In the first embodiment, the area of white pixels is reduced to minimize a white streak. If color shift correction according to the first embodiment is applied to an image that contains narrow lines, the pixel value of the white image on which the narrow lines are present may all become "0". The white pixels having a pixel value of "0" imply that no image of the base color (i.e., white) is printed and therefore the printed image can only be as bright as the color of the recording medium. This causes poor print quality. Thus, for an image containing narrow lines, it may be preferable that, at S32 shown in FIG. 12, the pixel value be replaced with an average pixel value of white pixels in the vicinity of pixels to be corrected. The use of the average pixel value is advantageous in that pixels closer to the area AR2 will be given smaller pixel value. Pixels having smaller pixel values consume smaller amounts of toner, so that pixels of the base color are not completely lost while still retaining the effects of color shift correction. Alternatively, pixels from which the average pixel value is calculated may be weighted so that the resultant pixel values are weighted. For example, a pixel closer to the pixel to be corrected is more weighted, hence the pixel closer to the pixel to be corrected is more affected.

Second Embodiment

{Configuration}

According to a second embodiment, the boundary between the color area (e.g., cyan, magenta, yellow, and black) and the non-color area is detected, and then the color area is expanded. The expanded portions of the color area are assigned colors (one of cyan, magenta, yellow, and black) other than the base color (i.e., white), so that no streak of the base color occurs when the image IM shown in FIG. 9 is printed. This prevents poor print quality.

Just as in the first embodiment, one or more of the black, yellow, magenta, cyan, and white pixels are printed one over the other to form a single composite pixel.

A printer 1 according to a second embodiment has substantially the same general configuration as that according to the first embodiment shown in FIG. 1. The second embodiment differs from the first embodiment in that an image processing section 250 is used. The image processing section 250 includes a color shift correcting section 251 and an output image processing section 52. The image processing section 250 processes the image data received from the image receiving section 42, and then outputs the processed image data to an image outputting section 80. The image processing section 250 differs from the image processing section 50 in the operation of the color shift correcting section 251.

As shown in FIG. 5, the color shift correcting section 251 includes a boundary detecting section 251a and a correction processing section 251b. The color shift correcting section 251 differs from the color shift correcting section 51 according to the first embodiment in the operation of the boundary detecting section 251a and the correction processing section 251b.

The boundary detecting section 251a detects a color area and a non-color area from the cyan, magenta, yellow, black, and white image data received from the image receiving section 42. The boundary detecting section 251a outputs boundary detection data describing the boundary detection results, and the cyan, magenta, yellow, black and white image data to the correction processing section 251b. The boundary detecting section 251a detects pixels in the non-color area closest to the boundary, the pixels being identified as boundary pixels. In other words, the boundary detecting section 251a generates a boundary area (fourth area) which is a peripheral portion of the non-color area and surrounds the color area (first area).

The correction processing section 251b performs color shift correction on the boundary pixels based on the boundary detection data and the cyan, magenta, yellow, black, and white image data. For example, the correction processing section 251b creates the fourth area in the second area (non-color area, the fourth area being contiguous to the first area (color area). The correction processing section 251b then corrects the image data such that pixels are printed with a larger amount of toner in the fourth area than in the second area. The correction processing section 251b then outputs the corrected image data to the output image processing section 52.

{Operation}

FIG. 16 is a flowchart illustrating the operation of the boundary detecting section 251a. Steps common to FIG. 16 and FIG. 7 have been given the same reference characters.

The boundary detecting section 251a defines a detection area (S20).

In order for a pixel of interest to be a boundary pixel, the pixel of interest must satisfy two criteria. First, the pixel values of cyan, magenta, yellow, black, and white pixels are large, i.e., within the non-color area. This is checked at S41. Second, all of the cyan, magenta, yellow, black and white pixels in a detection area DA are very small, e.g., "0." This is checked at S42.

The boundary detecting section 251a then checks the pixel values of pixels of interest for cyan, magenta, yellow, black, and white images to determine whether all of the pixels have a pixel value equal to or smaller than a third threshold TH3 (S41). If the answer is YES at S41, the program proceeds to S42. If the answer is NO at S41, the program proceeds to S24. The third threshold TH3 is a value base on which a decision is made to determine whether a pixel is a colorless. The third threshold TH3 is selected to be "0," which is different from the pixel values of cyan, magenta, yellow, black and white pixels. The third threshold TH3 may be different for different colors: cyan, magenta, yellow, black, and white.

Next, the boundary detecting section 251a checks the pixel values of the pixels in the detection area DA defined at S20 to determine whether anyone of cyan, magenta, yellow, and black pixels has a pixel value larger than the fourth threshold TH4 (S42). If the answer is YES at S42, the program proceeds to S23. If the answer is NO at S42, the program proceeds to S24. The fourth threshold TH4 is a pixel value based on which a decision is made to determine whether a pixel of interest is a color pixel. The fourth threshold TH4 is preferably selected to be one of the pixel values that cyan, magenta, yellow, and black may have, and is, for example, "15" in the second embodiment. Different thresholds may be selected for different colors, cyan, magenta, yellow, and black.

Steps S23 to S25 are common to FIG. 16 and FIG. 7.

Figure 17:
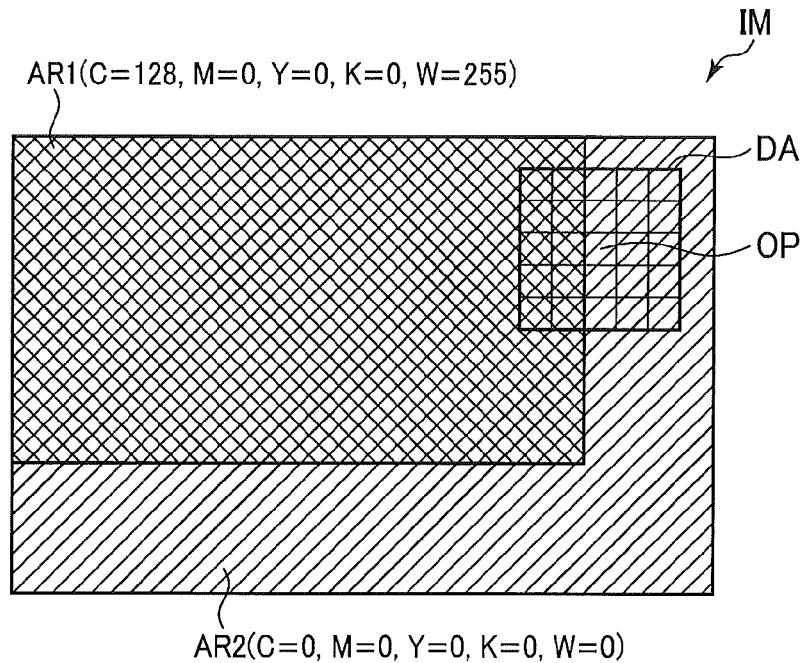
FIG. 17 illustrates the detection area in the image defined at S20 shown in FIG. 7.

The processes shown in FIG. 16 will be described in detail with reference to FIGS. 17 and 18. FIG. 17 illustrates the detection area DA in the image IM (FIG. 9) defined at S20 shown in FIG. 7. As shown in FIG. 17, a pixel in the image IM is taken as a pixel of interest, OP, and a detection area DA is defined with the pixel of interest, OP, at the center of the detection area DA. The detection area DA shown in FIG. 17 has 25 pixels: 5 pixels in each column and 5 pixels in each row.

At S41, assume that the third threshold TH3 has been selected to be "0". In the example shown in FIG. 17, the pixel of interest, OP, is in the area AR2, so all of the cyan, magenta, yellow, black and white pixels have no pixel value. Alternatively, the cyan, magenta, yellow, black and white pixels in the area AR2 may have a pixel value smaller than the third threshold TH3. Therefore, the answer at S41 is NO, and the program proceeds to S42.

At S42, assume that the fourth threshold TH4 has been selected to be "15." In the example shown in FIG. 17, since the detection area DA contains the fictitious pixels in the area AR1, there exist pixels having pixel values larger than the fourth threshold TH4. Therefore, it is determined at S42 that the answer is YES, and the program proceeds to S23 where the pixel of interest, OP, is determined to be a boundary pixel.

Figure 18:
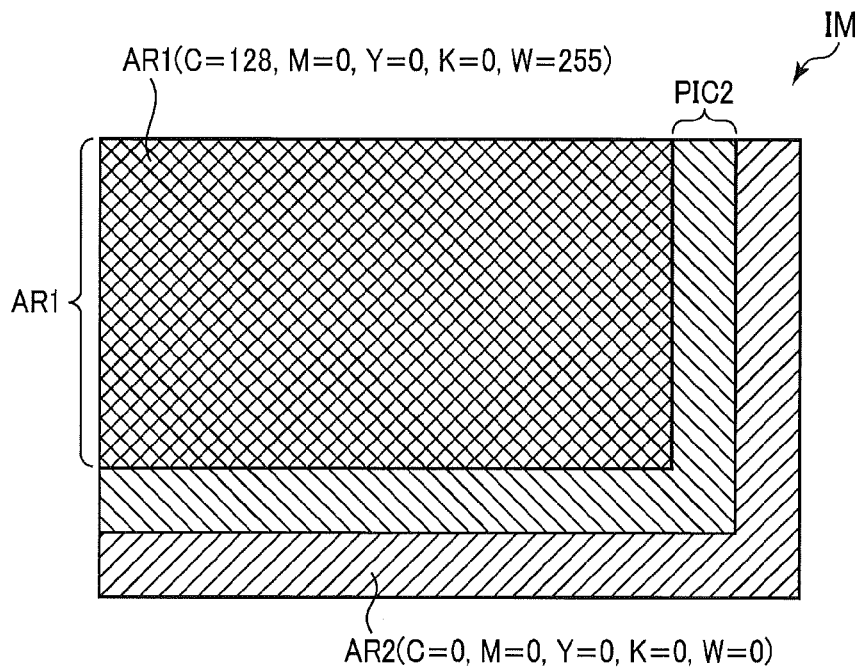
FIG. 18 illustrates the results of the boundary detection process performed on the image by the flow shown in FIG. 16.

FIG. 18 illustrates the results of boundary detection process performed on the image IM (FIG. 9) by the flow shown in FIG. 16. The boundary detection process detects boundary pixels, which are two pixels PIC2 in the area AR2. Thus, the boundary pixels PIC2 lie in an area between the area AR1 and a remaining part of the area AR2.

Figure 19:
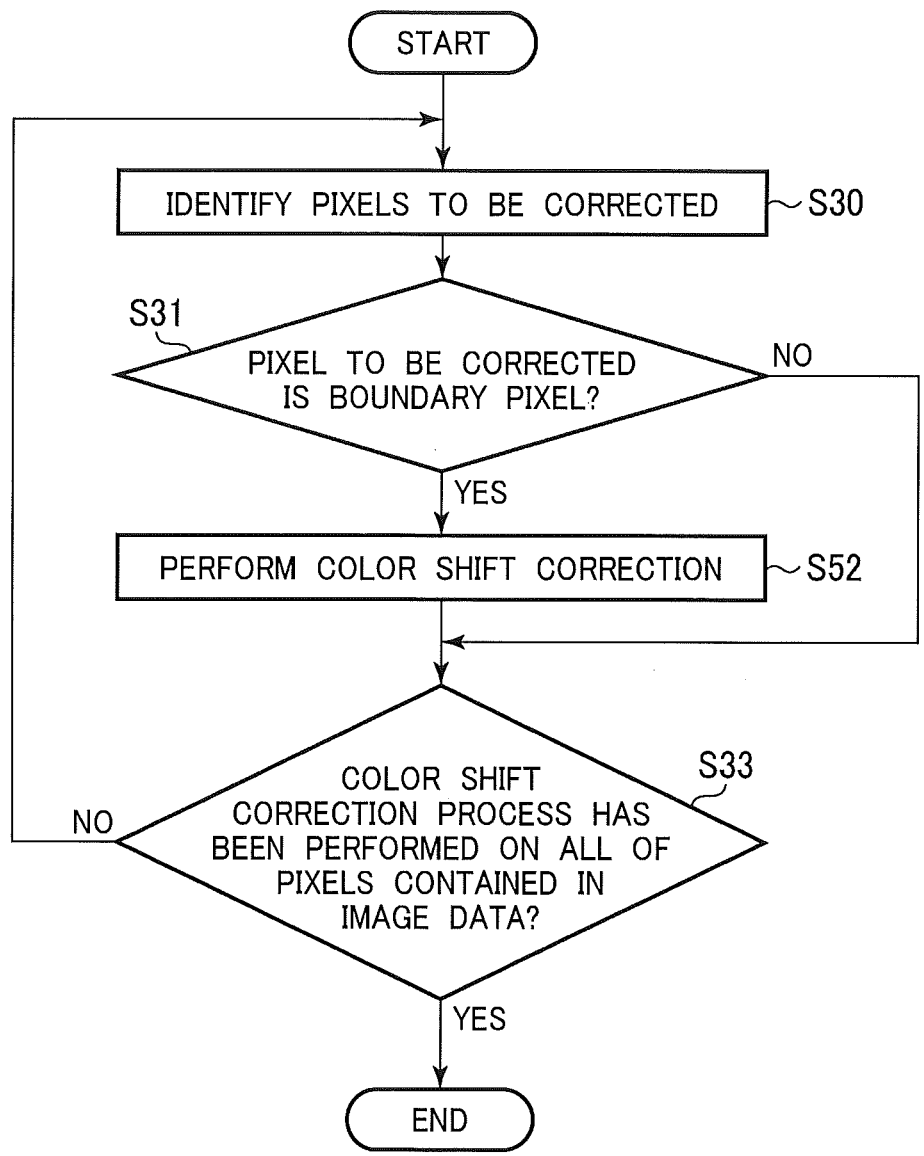
FIG. 19 is a flowchart illustrating the operation of the correction processing section.

FIG. 19 is a flowchart illustrating the operation of the correction processing section 251b. Those steps common to FIGS. 12 and 19 have been given the same reference numerals. The correction processing section 251b identifies pixels to be corrected from among pixels described by the image data received from the boundary detecting section 251a (S30).

The correction processing section 251b checks the boundary detection data received from the boundary detecting section 251a to determine whether the pixel to be corrected is a boundary pixel (S31). If the pixel to be corrected is a boundary pixel (YES at S31), the program proceeds to S52.

At S52, the correction processing section 251b replaces the pixel values of cyan, magenta, yellow, and black pixels to be corrected with the pixel value of at least one of the cyan, magenta, yellow, and black pixels, thereby performing color shift correction. For example, each of the pixel values of cyan, magenta, yellow, and black pixels may be replaced with a corresponding maximum pixel value of the cyan, magenta, yellow, and black pixels in a predetermined peripheral area. Alternatively, each of the pixel values of cyan, magenta, yellow, and black pixels may be replaced with a corresponding average pixel value of the cyan, magenta, yellow, and black pixels in a predetermined peripheral area.

Figure 20:
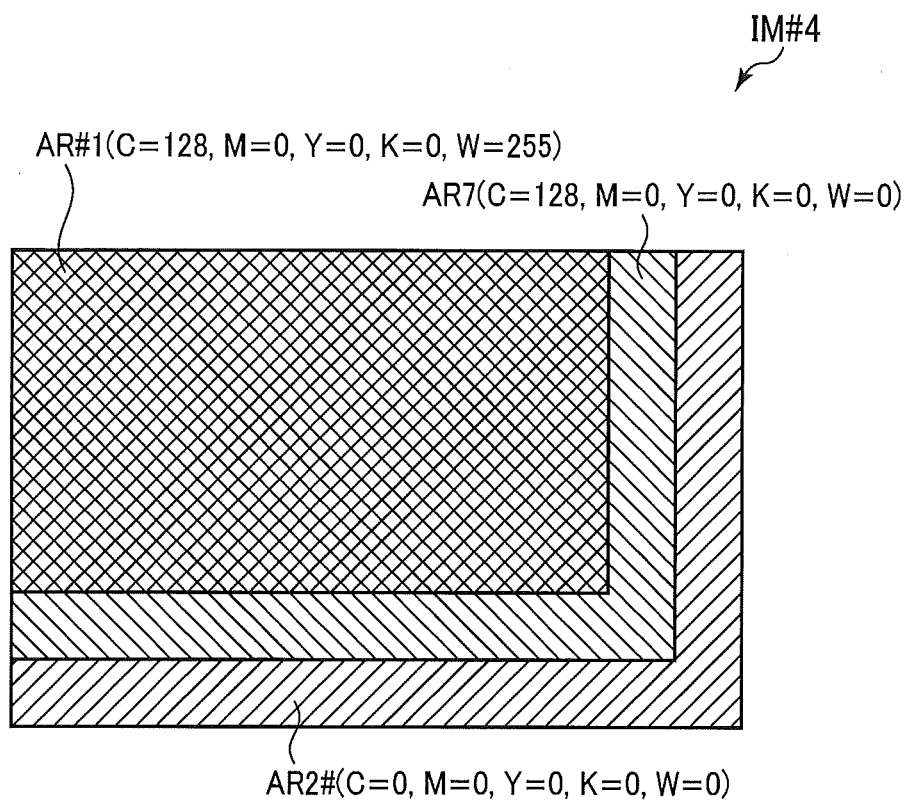
FIG. 20 illustrates the results of the color shift correction according to the second embodiment performed on the image shown in FIG. 9.

FIG. 20 illustrates the results of color shift correction according to the second embodiment performed on the image IM shown in FIG. 9. FIG. 20 shows an area AR7 located between the AR1, which is the same as that shown in FIG. 9, and an area AR2# in which the pixels have the same pixel values as those in the area AR2 shown in FIG. 9. The pixels values of cyan, magenta, yellow, and black pixels in the area AR7 have been replaced with a corresponding maximum pixel value of pixels in the vicinity of the pixel to be corrected. For example, in FIG. 20, the cyan pixels in the area AR7 have a pixel value of "128," which is the largest pixel value in the peripheral area. The peripheral area may be the detection area DA defined at S20 shown in FIG. 16 or another area different from the detection area DA. As shown in FIG. 20, the correction processing section 251b defines a peripheral portion of the non-color area shown in FIG. 9 as the area AR7.

Figure 21A:
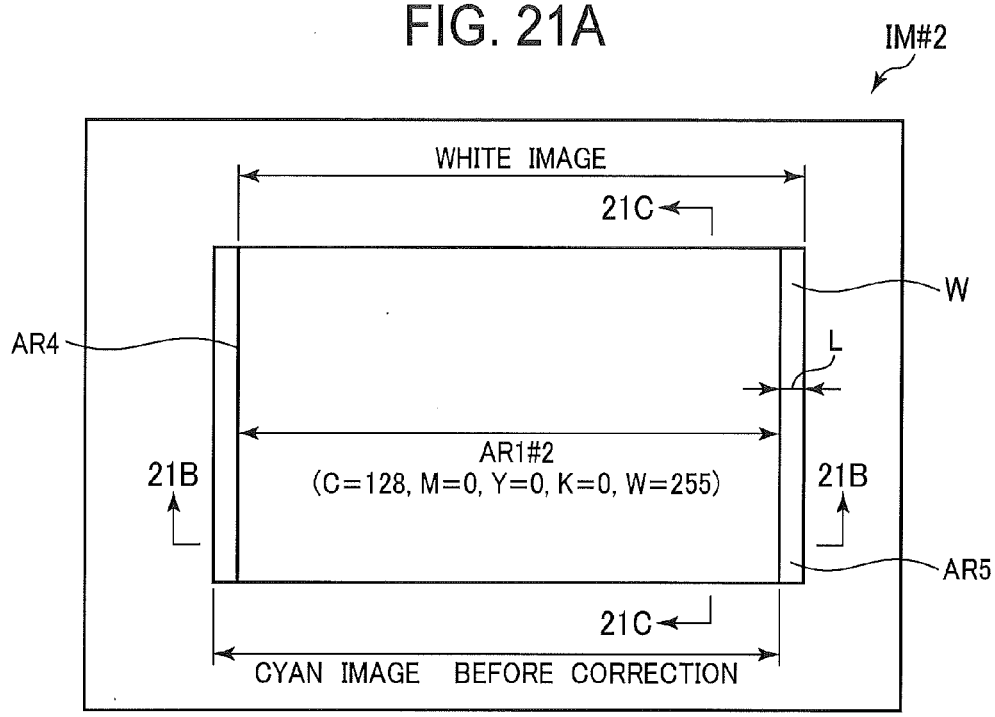
FIG. 21A-21C illustrate an example of the image shown in FIG. 9 before performing the color shift correction.
Figure 21B:
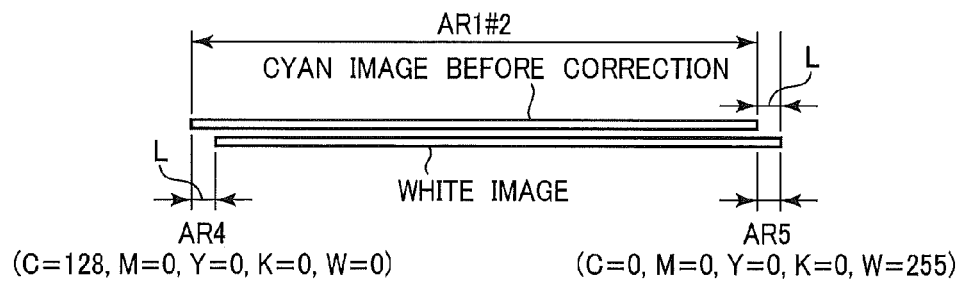
Figure 21C:
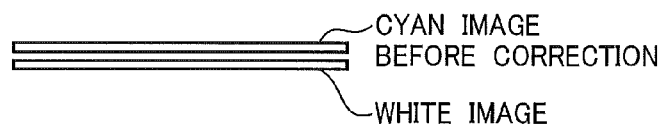

FIGS. 21A-21C illustrate an example of the image IM shown in FIG. 9 before performing color shift correction. FIG. 21B is a cross-sectional view taken along a line 21B-21B in FIG. 21A. FIG. 21C is a cross-sectional view taken along a line 21C-21C in FIG. 21A. In this example, a solid white image is formed on the recording medium and then a solid cyan image is formed on the solid white image. Note that color shift has occurred in a white image, shifting the white image by one pixel rightward. Color shift has occurred on the image and resulted in an area AR4 (FIG. 21B) to the left of an area AR1#2 and an area AR5 (FIG. 21B) to the right of the area AR1#2. The area AR5 contains white pixels only. The pixels in the area AR4 are cyan pixels only. The pixels in the area AR4 have the same color, i.e., cyan, as those in the area AR1#2, but have only slightly lower pixel values. The area AR2 in FIG. 21A is an area in which the recording medium is directly exposed. The area AR5 have white pixels only, and therefore the pixels in the area AR5 form a white streak between the areas AR1#2 and AR2, causing poor print quality.

Figure 22A:
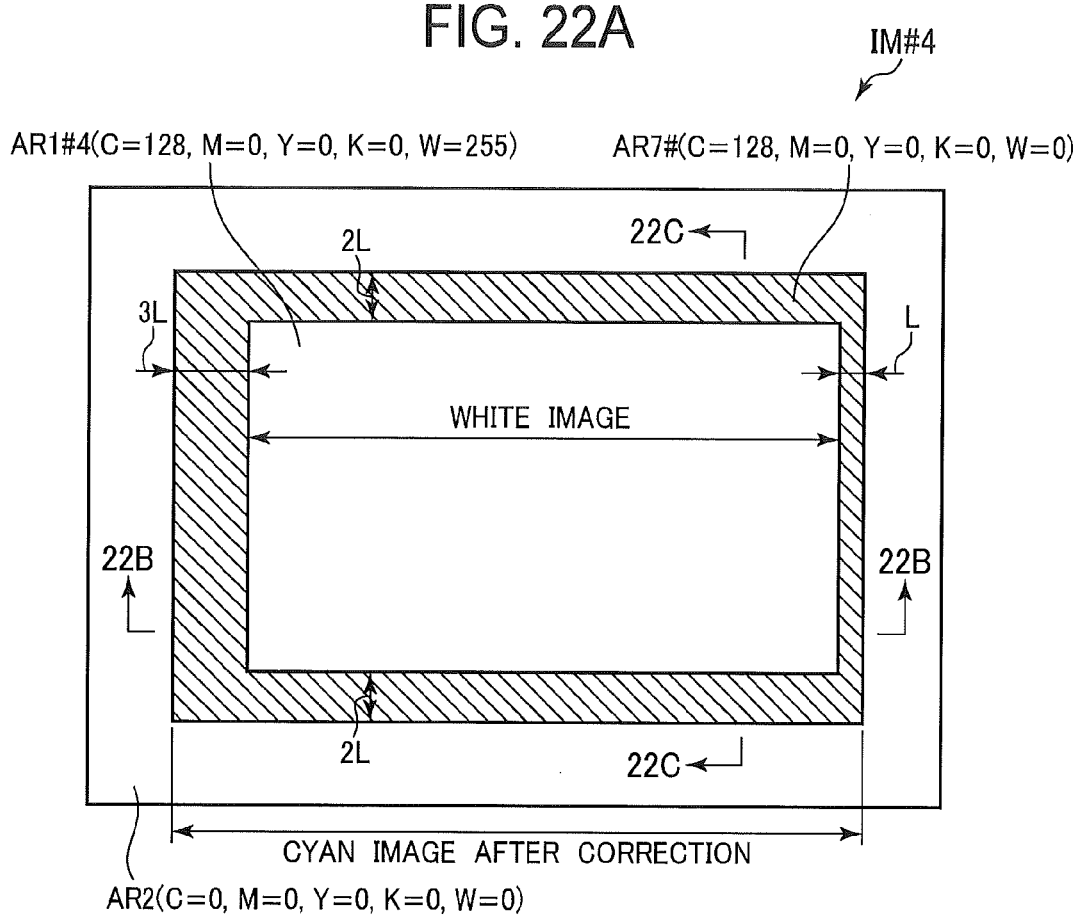
FIG. 22A-22C illustrate an example of the image shown in FIG. 9 after performing the color shift correction.
Figure 22B:
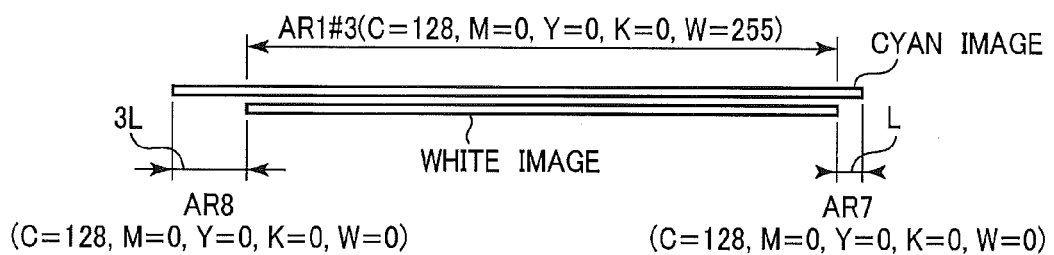
Figure 22C:
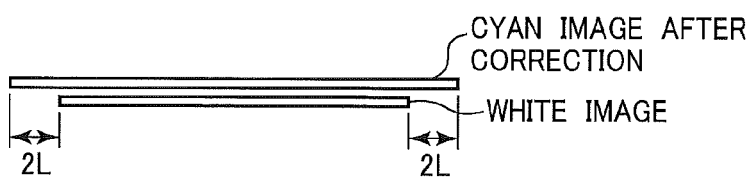

FIGS. 22A-22B illustrate an example of the image IM shown in FIG. 9 after performing color shift correction. FIG. 22B is a cross-sectional view taken along a line 22B-22B in FIG. 22A. FIG. 22C is a cross-sectional view taken along a line 22C-22C in FIG. 22A.

As a result of color shift correction, the cyan image is expanded by a distance 2L in four directions (left, right, top, and bottom), creating an area AR7# surrounding the area AR1#4. The pixels in the area AR7 (hatched area) have pixel values calculated based on the pixels in the peripheral area. Therefore, even if color shift has occurred in the white image in the area AR1 of the image IM shown in FIG. 9 so that the white image is shifted rightward by one pixel as shown in FIG. 21B, the color shift correction results in the area AR7# surrounding the area AR1#4, and does not result in a white-only area to the right of the area AR1#4. Thus, the color shift correction successfully eliminates a white-only area. The pixels in the area AR7# have the same color as those in the area AR1 and therefore color shift is not detectable.

In the second embodiment, the color areas of cyan, magenta, yellow, and black pixels are expanded, thereby preventing a white streak. Expansion of the color area of cyan, magenta, yellow, and black pixels may cause characters and lines to look thicker. If the characters and thick lines become detectable as a result of color shift correction, S52 shown in FIG. 19 may be modified such that the pixel value of a pixel to be corrected is replaced with an average pixel value of the pixels in the vicinity of the pixel of interest. In FIG. 18, the boundary pixels farther away from the area AR1 are affected more by the area AR2, and so they are replaced with smaller pixel values. Printing smaller pixel values requires smaller amounts of toners so that expansion of characters and lines is minimized while still retaining the effects of color shift correction. Also, weighted pixel values may be used to adjust the pixel value of a pixel to be replaced. For example, a larger weight is given to a pixel closer to the pixels from which an average pixel value is taken, so that a pixel closer to the pixel to be corrected is more affected.

The processes according to the first embodiment may be combined with the processes according to the second embodiment.

In the first embodiment, the cyan, magenta, yellow, black, and white image data are inputted into the color shift correcting section 51. Alternatively, only white image may be processed as image data, in which case the boundary detecting section 51a checks (S21, FIG. 7) the pixel values of white pixels of interest to determine whether the pixels have pixel values larger than the first threshold TH1. If the answer is YES at S21 (FIG. 7), the program proceeds to S22. If the answer is NO at S21, the program proceeds to S24. At S22, the boundary detecting section 51a checks pixel values of the pixels in the detection area to determine whether all of the cyan, magenta, yellow, black and white pixels in the detecting area are equal to or smaller than a second threshold TH2. If all the pixels in the detection area are equal to or smaller than the second threshold TH2 (YES at S22), the program proceeds to S23. If none of the pixels in the detection area is equal to or smaller than the second threshold TH2 (NO at S22), the program proceeds to S24. If any one of the cyan, magenta, yellow, and black has a pixel value larger than "0," the white pixel also has a pixel value larger than "0." Therefore, only the white image data may be processed as image data.

In the second embodiment, the cyan, magenta, yellow, black, and white image data are inputted into the color shift correcting section 251. Alternatively, image data for four colors except white may be processed as image data, in which case at S41 shown in FIG. 16 may be modified as follows: The boundary detecting section 51a checks the pixel value of cyan, magenta, yellow, and black pixels to determine whether the pixels have pixel values larger than the third threshold TH3. If the answer is YES at S41, the program proceeds to S42. If the answer is NO at S41, the program proceeds to S24.

The image processing apparatus according to the first and second embodiments have been described in terms of a printer 1, which is an image forming apparatus. The invention is not limited to this. The image processing apparatus according to the invention may be an apparatus that processes images inputted into the apparatus. Such apparatus include a scanner, a multi-function peripheral (MFP), a facsimile machine, and a computer. A variety of modifications may be made without departing the scope of the invention.

What is claimed is:

1. An image processing apparatus comprising:
an image data receiving section through which base color image data describing a base color image and non-base color image data describing non-base color images are received;
a boundary detecting section configured to detect a boundary between a first area in which the base color image is formed and a second area in which no image is formed, the second area surrounding the first area;
a correction processing section configured to perform a correction process on the image data to generate one of a third area defined in a peripheral portion of the first area and a fourth area which is defined in a peripheral portion of the second area and is contiguous to the first area,
wherein the third area is contiguous with the second area all around a periphery thereof, fictitious pixels are present in the second area,
wherein a smaller amount of developer material of base color per pixel is consumed in the third and fourth areas than in the first area; and
an image printing section configured to print an image on a recording medium in accordance with the base color image data and non-base color image data after the correction.

2. The image processing apparatus according to claim 1, wherein the first area is such that the non-base color images are printed on the base color image;
the boundary detecting section defines the third area in the peripheral portion of the first area; and
the correction processing section performs the correction on the base color pixels that are described by the base color image data in the third area.

3. The image processing apparatus according to claim 2, wherein when the correction processing section performs the correction, the correction processing section reduces pixel values of the base color pixels in the third area.

4. The image processing apparatus according to claim 3, wherein when the correction processing section performs the correction, the correction processing section assigns a first pixel value to the pixels in the third area, the first pixel value being a value such that the base color pixels in the third area are not printed with the developer material of the base color.

5. The image processing apparatus according to claim 3, wherein the correction processing section generates an average value of a plurality of pixel values in a predetermined area such that a pixel in the third area is positioned in a center of the predetermined area.

6. The image processing apparatus according to claim 5, wherein the boundary detecting section defines fictitious pixels in the peripheral portion of the second area closest to the first area;
wherein the correction processing section generates an average value of the pixel values of the pixels in the third area and the fictitious pixels in the peripheral portion of the second area.

7. The image processing apparatus according to claim 2, wherein the pixels in the third area have a second pixel value smaller than a first threshold and larger than a second threshold.

8. The image processing apparatus according to claim 1, wherein the first area is such that the non-base color images are formed on the base color image;
the boundary detecting section defines the fourth area in the peripheral portion of the second area closest to surrounding the first area; and
the correction processing section performs the correction on pixels described by the non-base color image data in the fourth area.

9. The image processing apparatus according to claim 8, wherein the correction processing section performs the correction such that a larger amount of developer material of the non-base color is consumed in the fourth area than in the second area.

10. The image processing apparatus according to claim 1, wherein the second area is such that the developer material of the non-base color is not consumed and the correction processing section assigns a third pixel value to the pixels in the fourth area, the third pixel value being such that a developer material of the non-base color is consumed.

11. The image processing apparatus according to claim 10, wherein the correction processing section determines a largest pixel value of pixels of the non-base color in a portion of the first area, and assigns the largest pixel value to the pixels in the third area.

12. The image processing apparatus according to claim 10, wherein the correction processing section calculates an average pixel value for the pixel values of the pixels in the first area, and then assigns the average pixel value to the pixels in the fourth area.

13. The image processing apparatus according to claim 8, wherein the pixels in the fourth area have a fourth pixel value smaller than a third threshold and larger than a fourth threshold.

14. The image processing apparatus according to claim 1, wherein the base color is white and the non-base color includes at least one of cyan, magenta, yellow, and black.

15. The image processing apparatus according to claim 1, wherein the base color and non-base color are monochromatic.

16. The image processing apparatus according to claim 1, wherein the base color image is formed on the recording medium and the non-base color image is then formed on the base color image.

17. The image processing apparatus according to claim 1, wherein the pixels described by the non-base color image data are formed in registration with the pixels described by the base color image data.

18. The image processing apparatus according to claim 1, wherein the recording medium has a color different from the base color and the non-base color.

19. An image forming apparatus, comprising:
an image receiving section through which base color image data describing a base color image and non-base color image data describing non-base color images are received;
a boundary detecting section configured to detect a boundary between a first area in which the base color image is formed and a second area in which no image is formed, the second area surrounding the first area, the boundary being detected based on the base color image data and non-base color image data;
a correction processing section configured to perform a correction process on the image data to generate one of a third area defined in a peripheral portion of the first area and a fourth area defined in a peripheral portion of the second area surrounding the first area,
wherein the third area is contiguous with the second area all around a periphery thereof and fictitious pixels are present in the second area,
wherein a smaller amount of developer material of base color per pixel is consumed in the third and fourth areas than in the first area; and
an image outputting section configured to form an image on a recording medium in accordance with the base color image data and non-base color image data after the correction.

20. A method for processing images, comprising:
receiving base color image data describing a base color image and non-base color image data describing non-base color images;
detecting a boundary between a first area in which the base color image is formed and a second area in which no image is formed;
defining a boundary area based on one of a third area defined in a peripheral portion of the first area and a fourth area defined in a peripheral portion of the second area surrounding the first area;
correcting the base color image data and the non-base color image data such that a small amount of a developer material of the base color is consumed in the third and fourth areas than in the first area; and
printing on a recording medium in accordance with the base color image data and the non-base color image data after the correction.

* * * * *